(12) United States Patent
Wengreen

(10) Patent No.: US 11,931,610 B1
(45) Date of Patent: Mar. 19, 2024

(54) DRONES THAT USE EARLY DETECTION SYSTEMS TO PREVENT WILDFIRES

(71) Applicant: Owen Charles Wengreen, Sammamish, WA (US)

(72) Inventor: Owen Charles Wengreen, Sammamish, WA (US)

( * ) Notice: Subject to any disclaimer, the term of this patent is extended or adjusted under 35 U.S.C. 154(b) by 0 days.

(21) Appl. No.: 18/234,818

(22) Filed: Aug. 16, 2023

Related U.S. Application Data

(63) Continuation of application No. 18/234,812, filed on Aug. 16, 2023.

(51) Int. Cl.
*A62C 3/02* (2006.01)
*B64U 10/14* (2023.01)
*B64U 101/30* (2023.01)
*B64U 101/47* (2023.01)

(52) U.S. Cl.
CPC .......... *A62C 3/0271* (2013.01); *A62C 3/0242* (2013.01); *B64U 10/14* (2023.01); *B64U 2101/30* (2023.01); *B64U 2101/47* (2023.01); *B64U 2201/10* (2023.01)

(58) Field of Classification Search
CPC ...... A62C 3/0242; A62C 3/0271; B64D 1/18; B64U 2101/00; B64U 2101/55; B64U 2101/56; B64U 10/14; B64U 2101/30; B64U 2101/47; G08B 17/005
See application file for complete search history.

(56) References Cited

U.S. PATENT DOCUMENTS

| | | | |
|---|---|---|---|
| 9,833,647 B2 | 12/2017 | Kawiecki | |
| 10,413,763 B2 | 9/2019 | Won | |
| 11,045,672 B2 | 6/2021 | Detweiler | |
| 11,182,611 B2 | 11/2021 | Ganti | |
| 11,324,979 B2 | 5/2022 | Inoue | |
| 11,565,813 B2 | 1/2023 | Fulbright | |
| 11,645,904 B2 * | 5/2023 | Trundle | G08B 25/006 701/2 |
| 11,730,987 B2 | 8/2023 | Conboy | |
| 2014/0027131 A1 * | 1/2014 | Kawiecki | A62C 3/0228 169/53 |
| 2020/0348697 A1 * | 11/2020 | Kuhara | G08B 13/1965 |
| 2021/0192175 A1 * | 6/2021 | Pineda | G06V 20/13 |
| 2021/0245880 A1 * | 8/2021 | Yan | G05D 1/0094 |
| 2021/0283439 A1 * | 9/2021 | Raucher | G06V 20/52 |
| 2023/0078676 A1 * | 3/2023 | Exner | H04W 4/024 340/577 |

* cited by examiner

*Primary Examiner* — Cody J Lieuwen

(57) ABSTRACT

Wildfires can quickly grow to enormous scales with devastating environmental impacts. Drone systems that provide early detection of wildfire risks can prevent wildfires before they grow out of control. Methods can use drones equipped with artificial intelligence to navigate through wooded locations and detect fire risks. Drones can include fire-detection hardware and fire-fighting hardware.

21 Claims, 10 Drawing Sheets

DRONES THAT USE EARLY DETECTION SYSTEMS TO PREVENT WILDFIRES

BACKGROUND

Field

Various embodiments disclosed herein relate to drones. Certain embodiments relate to drones that prevent wildfires.

Description of Related Art

According to the U.S. Forest Service Research Data Archive, 84% of wildfires are caused by humans. Wildfires release enormous quantities of carbon dioxide and other greenhouse gases in addition to devastating animal habitats, destroying homes, and causing fatalities.

Even with recent advances in wildfire prevention technologies and procedures, according to the National Interagency Fire Center, there were 24,211 wildfires in 2022 in the United States, which burned nearly six million acres. Thus, there is a need for systems and methods that can further improve the prevention of wildfires.

SUMMARY

Some embodiments comprise using a drone system to prevent wildfires. A drone system can comprise one or more drones. Some drone systems comprise many drones that each look for campfires.

In some embodiments, a first drone comprises an infrared camera system. Embodiments can comprise flying a first drone in view of a camping area having a first campsite; and detecting, by the infrared camera system, a first heat signature of the first campsite.

Some embodiments comprise determining, by the drone system, that the first heat signature is indicative of a first fire; detecting, by the infrared camera system, a second heat signature of the first campsite; and determining, by the drone system, that the second heat signature is indicative of a person not being present at the first campsite.

In response to determining that the first heat signature is indicative of the first fire and determining that the second heat signature is indicative of the person not being present at the first campsite, some embodiments comprise sending, by the drone system, a notification regarding the first fire to a remote computing device.

In response to determining that the first heat signature is indicative of the first fire and determining that the second heat signature is indicative of the person not being present at the first campsite, some embodiments comprise delivering, by the first drone, a fire retardant on the first fire.

In response to determining that the first heat signature is indicative of the first fire and determining that the second heat signature is indicative of the person not being present at the first campsite, some embodiments comprise fining, by the drone system, the person.

Some embodiments comprise determining, by the drone system, a reservation holder associated with the first campsite. In response to determining that the first heat signature is indicative of the first fire and determining that the second heat signature is indicative of the person not being present at the first campsite, some embodiments comprise fining, by the drone system, the reservation holder.

In some embodiments, a first drone comprises a visible-light camera system. In response to determining that the first heat signature is indicative of the first fire and determining that the second heat signature is indicative of the person not being present at the first campsite, some embodiments comprise taking, by the visible-light camera system, at least one picture of the first campsite.

In some embodiments, the first drone comprises a visible-light camera system. In response to determining that the first heat signature is indicative of the first fire and determining that the second heat signature is indicative of the person not being present at the first campsite, some embodiments comprise flying, autonomously by the first drone, closer to an automobile having a license plate, and then taking, by the visible-light camera system, a picture of the license plate. The license plate can comprise an alphanumeric identification.

Some embodiments comprise sending, by the drone system, a notification comprising the alphanumeric identification to a remote computing device.

Some embodiments use Global Positioning System ("GPS") locations. GPS locations can enable the drone system to autonomously fly the first drone from one campsite to the next campsite throughout a camping area that could have dozens or even hundreds of campsites. GPS locations can enable the drone system to autonomously fly the first drone within boundaries of a single campsite to more thoroughly inspect the single campsite for fires and people than would be practical (at least in some embodiments but not in all embodiments) using a flight path optimized for flying from one campsite to the next campsite throughout a camping area to quickly check the entire camping area for fires.

Some embodiments comprise determining, by the drone system, a GPS location of the first fire; and associating, by the drone system, the GPS location with an alphanumeric identification of the first campsite. In response to determining that the first heat signature is indicative of the first fire and determining that the second heat signature is indicative of the person not being present at the first campsite, some embodiments comprise sending, by the drone system, the alphanumeric identification to the remote computing device.

In some embodiments, a first drone comprises an infrared camera system. Embodiments can comprise flying a first drone over a camping area having a first campsite. Embodiments can comprise detecting, by the infrared camera system, a first heat signature of the first campsite. The first heat signature can be the heat signature of a first fire located in the first campsite.

In some embodiments, the infrared camera system detects the first heat signature while the drone is at a first location. Embodiments can comprise determining, by the drone system, that the first heat signature is indicative of a first fire; detecting, by the infrared camera system, a second heat signature of the first campsite; and determining, by the drone system, that the second heat signature is indicative of a person not being present at the first campsite.

In response to determining, by the drone system, that the first heat signature is indicative of the first fire, embodiments can comprise altering, by the drone system, a first flight path of the first drone to fly the first drone closer to the first fire; then detecting, by the infrared camera system, a third heat signature of the first fire at a second location that is closer to the first fire than the first location, and then determining, by the drone system, that the third heat signature is indicative of the first fire.

In response to determining that the third heat signature is indicative of the first fire and determining that the second heat signature is indicative of the person not being present at the first campsite, embodiments can comprise sending, by the drone system, a notification regarding the first fire to a remote computing device.

In some embodiments, a first drone comprises an infrared camera system. Embodiments can comprise flying a first drone over a camping area having a first campsite. Embodiments can comprise detecting, by the infrared camera system, a first heat signature of the first campsite.

In some embodiments, the infrared camera system detects the first heat signature while the drone is at a first location. Embodiments can comprise detecting the first heat signature while the drone is at the first location; determining, by the drone system, that the first heat signature is indicative of a first fire; detecting, by the infrared camera system, a second heat signature of the first campsite; and determining, by the drone system, that the second heat signature is indicative of a person not being present at the first campsite.

Some embodiments comprise, in response to determining, by the drone system, that the first heat signature is indicative of the first fire: leaving, by the first drone, a first flight path configured to enable the first drone to fly between the first campsite and a second campsite of the camping area, then flying, by the first drone, along a second flight path configured to enable the infrared camera system to detect a third heat signature of the first fire at a second location that is not on the first flight path, then detecting, by the infrared camera system, the third heat signature at the second location, and then determining, by the drone system, that the third heat signature is indicative of the first fire.

Some embodiments comprise, in response to determining that the third heat signature is indicative of the first fire and determining that the second heat signature is indicative of the person not being present at the first campsite: sending, by the drone system, a notification regarding the first fire to a remote computing device.

In some embodiments, the second flight path curves around the first fire.

Some embodiments use Global Positioning System ("GPS") locations, which can be defined by Global Positioning System ("GPS") coordinates.

In some embodiments, the second flight path comprises a portion that is closer to the first fire than the first flight path. The first flight path can comprise a first set of GPS coordinates configured to enable the first drone to autonomously navigate between the first campsite and the second campsite. The second flight path can comprise a second set of GPS coordinates configured to enable the first drone to autonomously navigate through at least a portion of the first campsite.

In some embodiments, the second location is located within an area that is shaped as a 45-degree cone having a vertex that is located at a center of the first fire. The height of the cone can be 100 feet. Embodiments can comprise, flying, autonomously by the first drone, along the second flight path through the area.

In some embodiments, an infrared camera system detects the first heat signature while the drone is located at a first location. Embodiments can comprise determining, by the drone system, that the first heat signature is indicative of a first fire.

Embodiments can comprise, in response to determining, by the drone system, that the first heat signature is indicative of the first fire: leaving, by the first drone, a first flight path configured to enable the first drone to fly between the first campsite and a second campsite of the camping area, then flying, by the first drone, along a second flight path. Embodiments can comprise, at a second location located on the second flight path, detecting, by the infrared camera system, a second heat signature of the first campsite.

Embodiments can comprise determining, by the drone system, that the second heat signature is indicative of a person not being present at the first campsite.

Embodiments can comprise, in response to determining that the first heat signature is indicative of the first fire and determining that the second heat signature is indicative of the person not being present at the first campsite: sending, by the drone system, a notification regarding the first fire to a remote computing device.

In some embodiments, the second flight path is configured to search for the person. Embodiments can comprise, in response to determining that the first heat signature is indicative of the first fire and determining that the second heat signature is indicative of the person not being present at the first campsite: leaving, by the first drone, the second flight path; then flying, by the drone system, the first drone along a third flight path closer to the first fire than at least a portion of the second flight path; and then delivering, by the first drone, a fire retardant on the first fire while flying, by the drone system, the first drone along the third flight path.

In some embodiments, the third flight path comprises a spiral-shaped portion. Embodiments can comprise flying, autonomously by the drone system, the first drone along the spiral-shaped portion while delivering, by the first drone, the fire retardant on the first fire.

In some embodiments, the second flight path comprises a portion that is closer to the first fire than the first flight path.

In some embodiments, the first location is on the first flight path, the first flight path comprises a first set of GPS coordinates configured to enable the first drone to navigate through at least a portion of the camping area, the portion of the camping area comprises the first campsite and the second campsite, and the second flight path comprises a second set of GPS coordinates configured to enable the first drone to navigate through at least a portion of the first campsite.

In some embodiments, the second location is closer to the first fire than the first location.

In some embodiments, the second location is located within an area that is shaped as a 45-degree cone having a vertex that is located at a center of the first fire. The height of the cone can be 100 feet, 1,000 feet, at least 500 feet, and/or less than 1,200 feet.

In some embodiments, detecting, by the infrared camera system, the second heat signature of the first campsite comprises flying, autonomously by the first drone, into the area that is shaped as the 45-degree cone, orienting, by the first drone, the infrared camera system outward from the cone to detect the second heat signature outside the 45-degree cone while the first drone is located inside the 45-degree cone.

In some embodiments, a drone system comprises drones that do not fly but instead have wheels to drive around camping areas looking for fires. Some drone systems comprise many drones that look like cars, which can be any size. Some cars are approximately 18 inches in length, have four wheels, and are driven autonomously by the drone system from one GPS coordinate to another GPS coordinate along a path that enables the cars to detect campfires and people.

Some embodiments comprise drone systems used in camping areas. The drone systems described herein can be used outside of camping areas.

Some embodiments comprise using a drone system. A drone system can comprise a first drone to prevent a wildfire. A drone system can comprise many flying drones to prevent wildfires. Each drone can comprise any of the features described in the context of the first drone.

In some embodiments, a first drone comprises a camera system. The camera system can comprise one or more cameras. Cameras can be configured to detect any light wavelength and light frequency including, but not limited to, light wavelengths and light frequencies for visible light, infrared light, and ultraviolet ("UV") light.

In some embodiments, the camera system comprises an infrared camera.

Some embodiments comprise flying a first drone in view of a camping area having a first campsite; and detecting, by the infrared camera, a first heat signature of the first campsite.

Some embodiments comprise determining, by the drone system, that the first heat signature is indicative of a first fire.

Some embodiments comprise taking, by the camera system, at least one picture of the first campsite; and determining, by the drone system, that the at least one picture does not show a person at the first campsite.

Some embodiments comprise, in response to determining that the first heat signature is indicative of the first fire and determining that the at least one picture does not show the person at the first campsite: sending, by the drone system, a notification regarding the first fire to a remote computing device.

In some embodiments, determining that the at least one picture does not show the person at the first campsite comprises determining, by the drone system, that the at least one picture does not comprise a shape indicative of the person.

In some embodiments, the camera system comprises an infrared ("IR") camera. Some embodiments comprise taking, by the infrared camera, the at least one picture of the first campsite.

In some embodiments, the camera system comprises an ultraviolet ("UV") camera. Some embodiments comprise taking, by the UV camera, the at least one picture of the first campsite.

In some embodiments, the camera system comprises a visible-light camera. Some embodiments comprise taking, by the visible-light camera, the at least one picture of the first campsite.

Some embodiments comprise a camera that can detect IR, UV, and visible light, and that can take the at least one picture using IR, UV, and/or visible light.

Some embodiments comprise sending, by the drone system, a notification regarding the first fire to the remote computing device. In some embodiments, the notification comprises an identification of the first campsite. In some embodiments, the notification comprises the at least one picture of the first campsite.

Some embodiments comprise detecting, by the infrared camera, a second heat signature of the first campsite; and determining, by the drone system, that the second heat signature is indicative of the person not being present at the first campsite.

Some embodiments comprise, in response to determining that the first heat signature is indicative of the first fire; determining that the at least one picture does not show the person at the first campsite; and determining that the second heat signature is indicative of the person not being present at the first campsite: sending, by the drone system, the notification regarding the first fire to the remote computing device.

Some embodiments comprise, in response to determining that the first heat signature is indicative of the first fire and determining that the at least one picture does not show the person at the first campsite: delivering, by the first drone, a fire retardant on the first fire.

Some embodiments comprise, in response to determining that the first heat signature is indicative of the first fire and determining that the at least one picture does not show the person at the first campsite: fining, by the drone system, the person.

Some embodiments comprise determining, by the drone system, a reservation holder associated with the first campsite. Some embodiments comprise, in response to determining that the first heat signature is indicative of the first fire and determining that the at least one picture does not show the person at the first campsite: fining, by the drone system, the reservation holder.

In some embodiments, the at least one picture comprises a first picture and a second picture. Some embodiments comprise, in response to determining that the first heat signature is indicative of the first fire and determining that the at least one picture does not show the person at the first campsite: flying, by the first drone, closer to an automobile having a license plate, and then taking, by the camera system, a third picture of the license plate.

In some embodiments, the automobile can be parked at the first campsite, the automobile can be parked adjacent to the first campsite, and/or the automobile can be parked within 500 feet of the first campsite.

In some embodiments, the license plate comprises an alphanumeric identification. Embodiments can comprise sending, by the drone system, the notification comprising the alphanumeric identification to the remote computing device.

Embodiments can comprise determining, by the drone system, a GPS location of the first fire; associating, by the drone system, the GPS location with an alphanumeric identification of the first campsite; and then in response to determining that the first heat signature is indicative of the first fire and determining that the at least one picture does not show the person at the first campsite: sending, by the drone system, the alphanumeric identification to the remote computing device.

In some embodiments, an infrared camera detects the first heat signature while the drone is located at a first location. Embodiments can comprise determining, by the drone system, that the first heat signature is indicative of a first fire.

Embodiments can comprise, in response to determining, by the drone system, that the first heat signature is indicative of the first fire: leaving, by the first drone, a first flight path configured to enable the first drone to fly between the first campsite and a second campsite of the camping area; and then flying, by the first drone, along a second flight path.

Embodiments can comprise, at a second location located on the second flight path, taking, by the camera system, at least one picture of the first campsite. Embodiments can comprise determining that the at least one picture does not show a person at the first campsite. Embodiments can comprise, in response to determining that the first heat signature is indicative of the first fire and determining that the at least one picture does not show the person at the first campsite: sending, by the drone system, a notification regarding the first fire to a remote computing device.

In some embodiments, the second flight path is configured to search for the person.

Some embodiments comprise, in response to determining that the first heat signature is indicative of the first fire and determining that the at least one picture does not show the person at the first campsite: leaving, by the first drone, the second flight path; then flying, autonomously by the drone system, the first drone along a third flight path closer to the first fire than at least a portion of the second flight path; and then delivering, by the first drone, a fire retardant on the first fire while flying, by the drone system, the first drone along the third flight path.

In some embodiments, the third flight path comprises a spiral-shaped portion. Some embodiments comprise flying, autonomously by the drone system, the first drone along the spiral-shaped portion while delivering, by the first drone, the fire retardant on the first fire. The spiral-shaped portion of the third flight path can cause the first drone to deliver the fire retardant on an outer portion of the first fire and then deliver the fire retardant on an inner portion of the first fire as the third flight path spirals inward toward a center of the first fire.

In some embodiments, the second flight path comprises a portion that is closer to the first fire than the first flight path. Embodiments can comprise flying, autonomously by the first drone, along the second flight path.

In some embodiments, the first location is on the first flight path. The first flight path can comprise a first set of GPS coordinates configured to enable the first drone to autonomously navigate through at least a portion of the camping area. The portion of the camping area can comprise the first campsite and the second campsite. The second flight path can comprise a second set of GPS coordinates configured to enable the first drone to autonomously navigate through at least a portion of the first campsite.

In some embodiments, the second flight path has a longer length through the first campsite than the first flight path. The first flight path can comprise a first flight length through the first campsite. The second flight path can comprise a second flight length through the first campsite. The second flight length can be at least 50 percent longer than the first flight length to enable a more thorough search for fires and people than would typically be the case with the first flight length.

In some embodiments, the second location is located closer to the first fire than the first location.

In some embodiments, the second location is located within an area that is shaped as a 45-degree cone having a vertex that is located at a center of the first fire. The height of the cone can be 100 feet.

In some embodiments, taking, by the camera system, the at least one picture of the first campsite comprises flying, by the first drone, into the area that is shaped as the 45-degree cone, and orienting, by the first drone, the camera system outward from the cone (e.g., while taking the at least one picture).

In some embodiments, the infrared camera detects the first heat signature while the drone is at a first location. Embodiments can comprise determining, by the drone system, that the first heat signature is indicative of a first fire; taking, by the camera system, at least one picture of the first campsite; and determining, by the drone system, that the at least one picture does not show a person at the first campsite.

Some embodiments comprise, in response to determining, by the drone system, that the first heat signature is indicative of the first fire: leaving, by the first drone, a first flight path configured to enable the first drone to fly between the first campsite and a second campsite of the camping area, then flying, by the first drone, along a second flight path configured to enable the infrared camera to detect a third heat signature of the first fire at a second location that is not on the first flight path, then detecting, by the infrared camera, the third heat signature at the second location, and then determining, by the drone system, that the third heat signature is indicative of the first fire.

Some embodiments comprise, in response to determining that the third heat signature is indicative of the first fire and determining that the at least one picture does not show the person at the first campsite: sending, by the drone system, a notification regarding the first fire to a remote computing device.

In some embodiments, a second flight path curves around the first fire. In some embodiments, a second flight path circles around at least 50 percent of the first fire. In some embodiments, a second flight path curves around the first fire and/or circles around the first fire while taking pictures by a camera system.

In some embodiments, the second flight path comprises a portion that is closer to the first fire than the first flight path. The first flight path can comprise a first set of GPS coordinates configured to enable the first drone to autonomously navigate through at least a portion of the camping area. The portion of the camping area can comprise the first campsite and the second campsite. The second flight path can comprise a second set of GPS coordinates configured to enable the first drone to autonomously navigate through at least a portion of the first campsite.

In some embodiments, a second location is located within an area that is shaped as a 45-degree cone having a vertex that is located at a center of the first fire. The height of the cone can be 100 feet. Embodiments can comprise flying, autonomously by the first drone, along the second flight path through the area.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
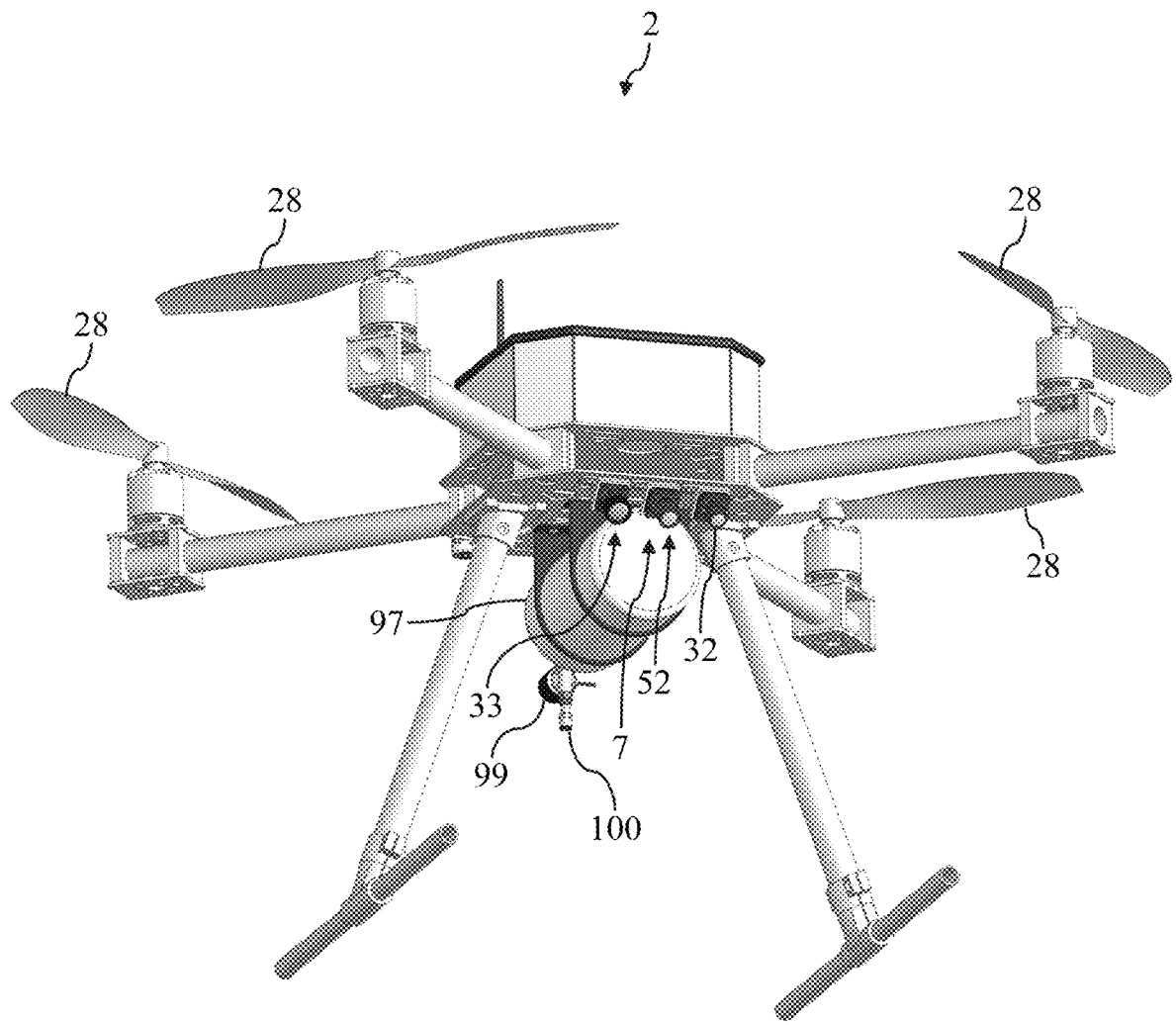
FIG. 1 illustrates a perspective view of a drone, according to some embodiments.
Figure 2:
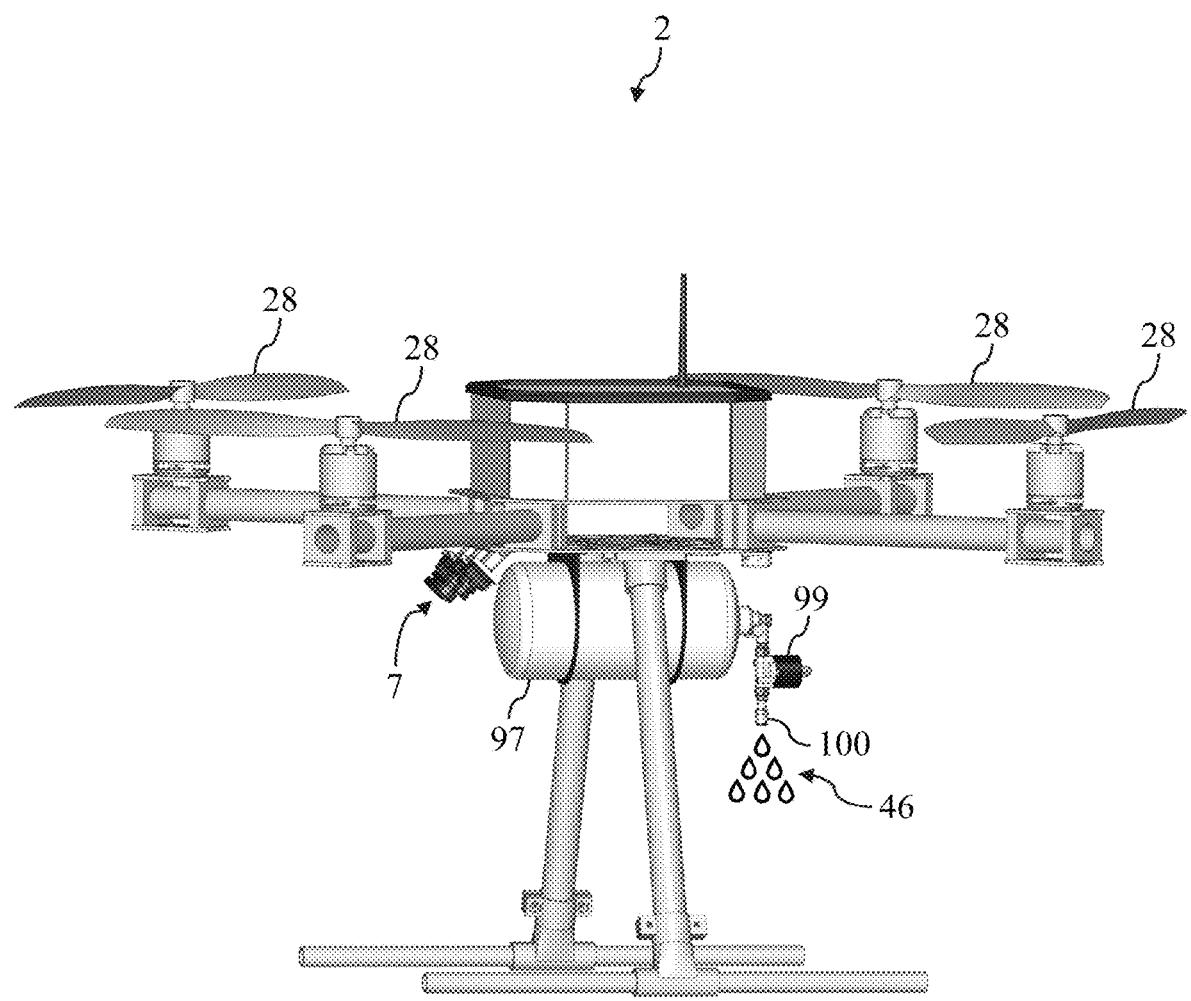
FIG. 2 illustrates a perspective view of a drone, according to some embodiments.
Figure 3:
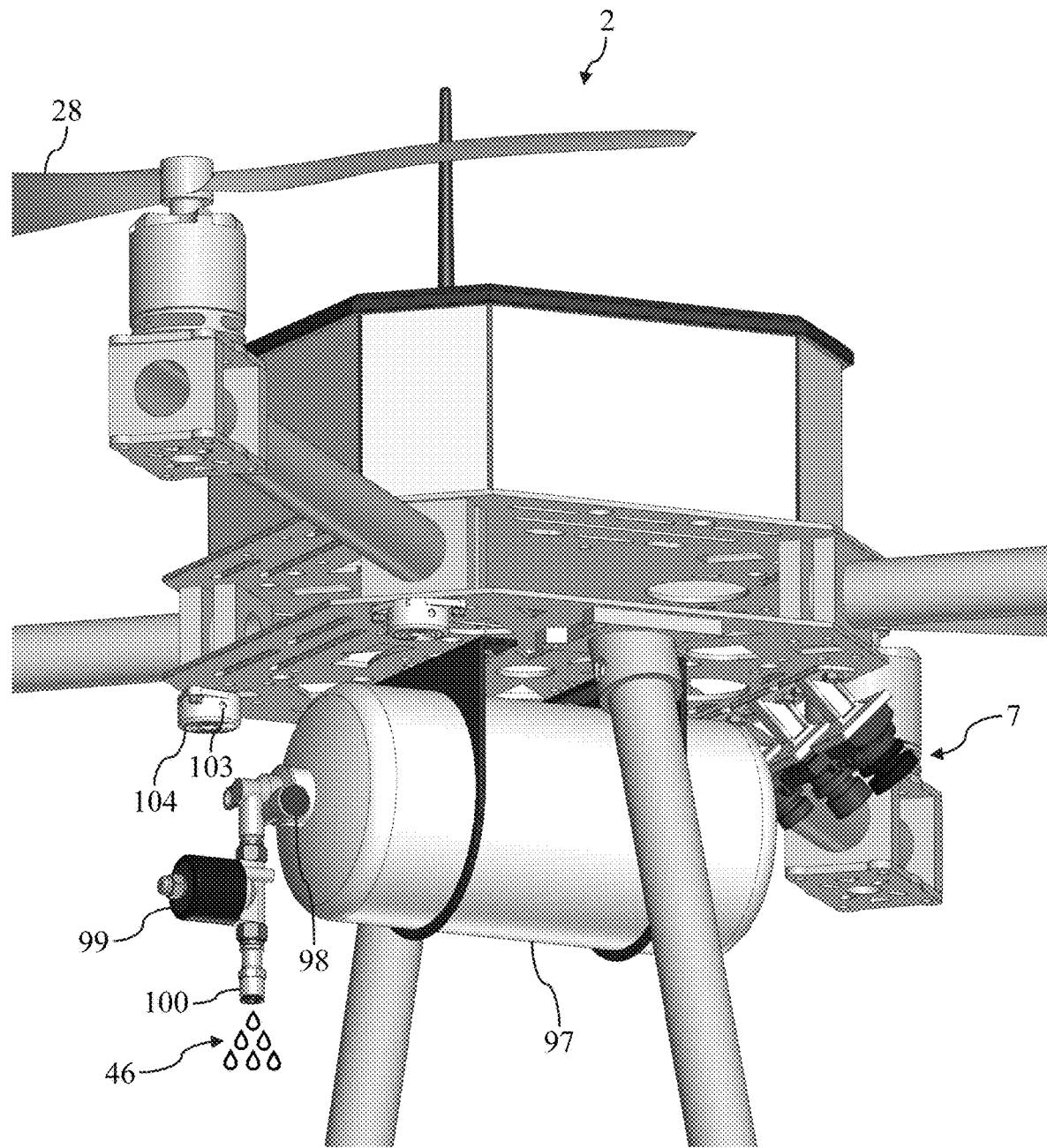
FIG. 3 illustrates a perspective view of portions of a drone, according to some embodiments.
Figure 4:
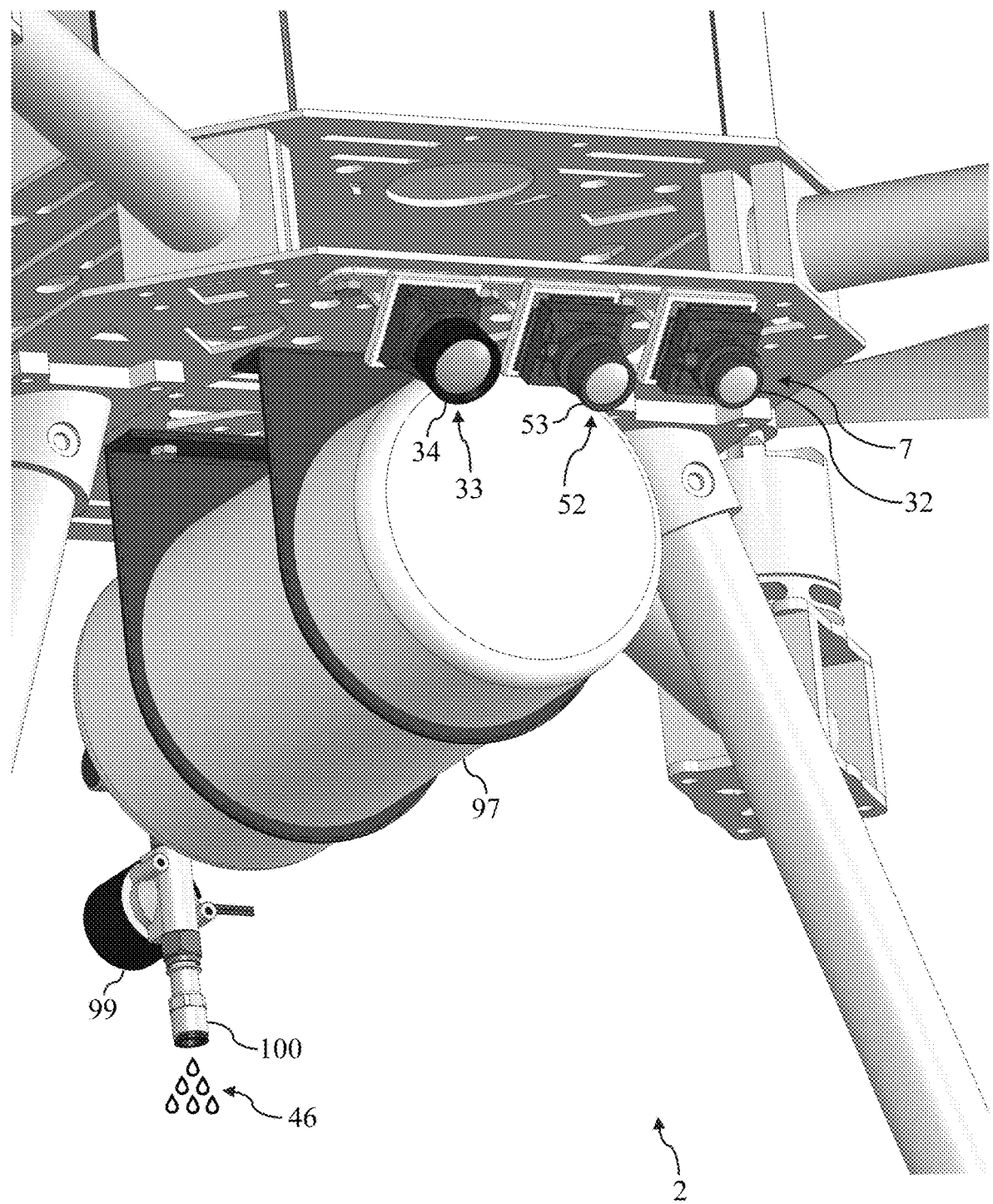
FIG. 4 illustrates a perspective view of portions of a drone, according to some embodiments.
Figure 5:
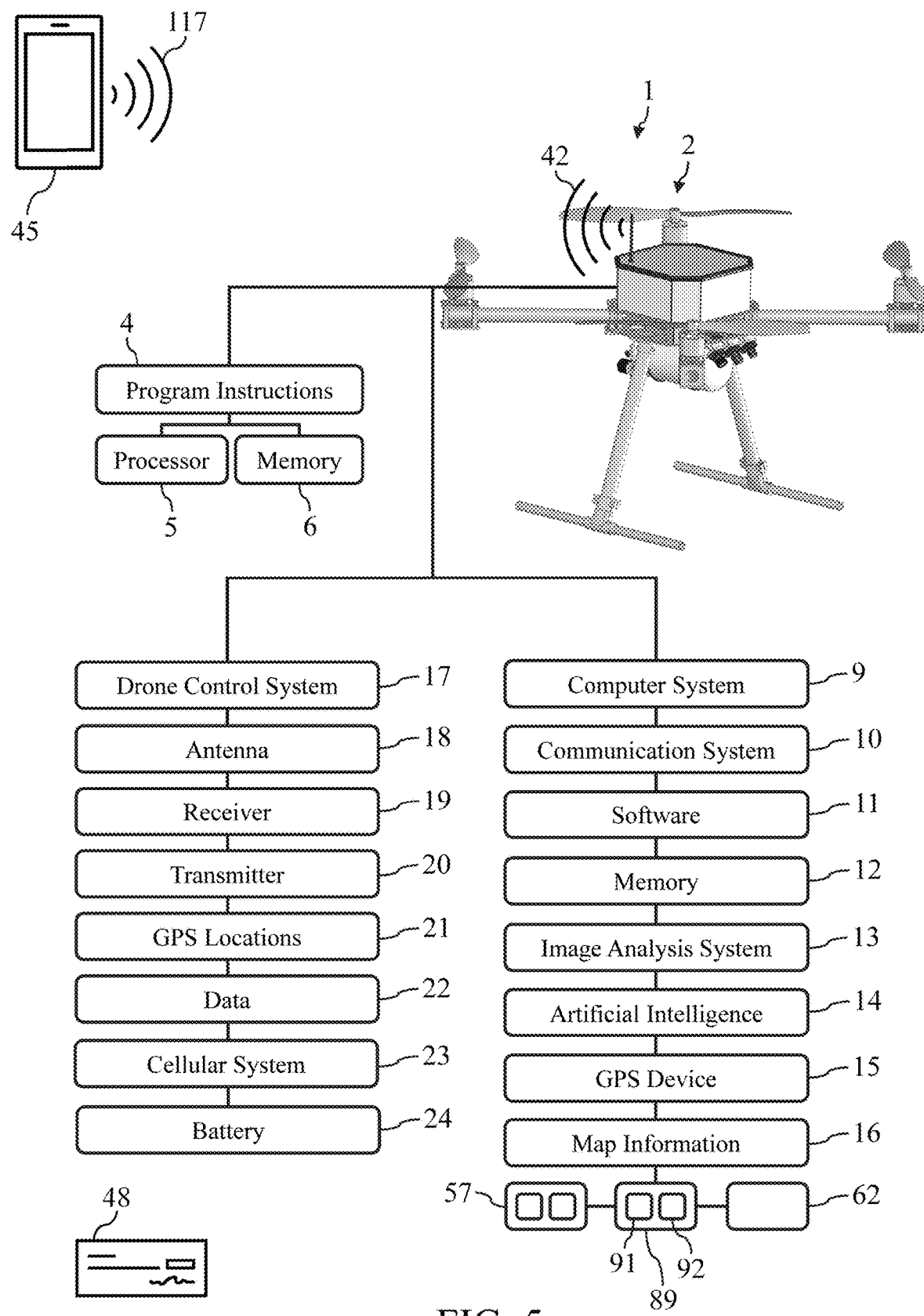
FIG. 5 illustrates a diagrammatic view of a drone system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

According to the U.S. Forest Service Research Data Archive, 84% of wildfires are caused by humans. According to the National Interagency Fire Center, there were 24,211 wildfires in 2022 in the United States, which burned nearly six million acres. Wildfires release enormous quantities of carbon dioxide and other greenhouse gases in addition to devastating animal habitats, destroying homes, and causing human fatalities.

In U.S. Forest Service land, an estimated 50% of wildfires are caused by campfires. Campfires that turn into wildfires have a devastating impact on our environment. A drone system 1 can prevent campfires from becoming wildfires.

A drone system 1 can comprise one or more drones. Some drone systems 1 comprise many drones 2 that each look for campfires. Drones can comprise propellers 28 configured to enable the drones to fly.

Artificial intelligence ("AI") can aid in the operation of a drone system 1 to prevent wildfires, through a combination of various technologies including computer vision, machine learning, and navigation algorithms. In some embodiments, a drone system 1 and/or a drone 2 operates completely without the aid of people. In some embodiments, AI provides helpful abilities, but people are still involved in some of the decision making of the drone system 1 and/or the drone 2. Some drone systems 1 include multiple drones 2 that can work together (e.g., to check many campsites).

Figure 10:
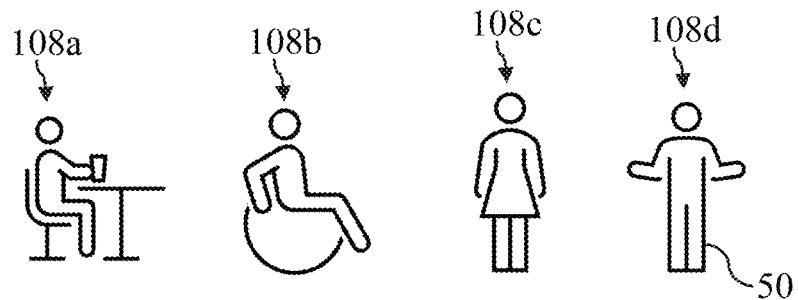
FIG. 10 illustrates a diagrammatic view of shapes that can be indicative of a person, according to some embodiments.
Figure 11:
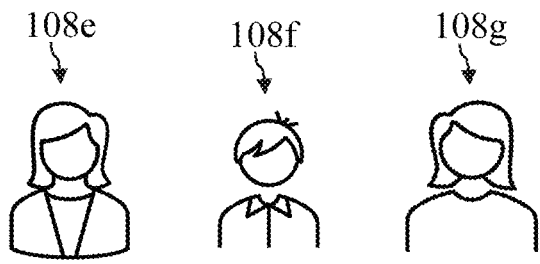
FIG. 11 illustrates a diagrammatic view of shapes that can be indicative of a person, according to some embodiments.

The drone 2 can include a camera 32, 34, 53. Computer vision helps the AI to interpret and understand visual data from the drone's 2 camera feed. Algorithms can be trained to recognize different objects such as fires and people. People have shapes (such as shapes 108*a*, 108*b*, 108*c*, 108*d*, 108*e*, 108*f*, 108*g* illustrated in FIGS. 10 and 11) that are unique from other shapes in a camping area. For example, AI can identify that a shape is a person's body rather than a tree, a rock, a fire pit, a tent, or a picnic table. AI can also identify that a shape is a person's face rather than the face of a bear or raccoon. Thus, AI can be used to determine if a shape is indicative of a person.

Figure 8:
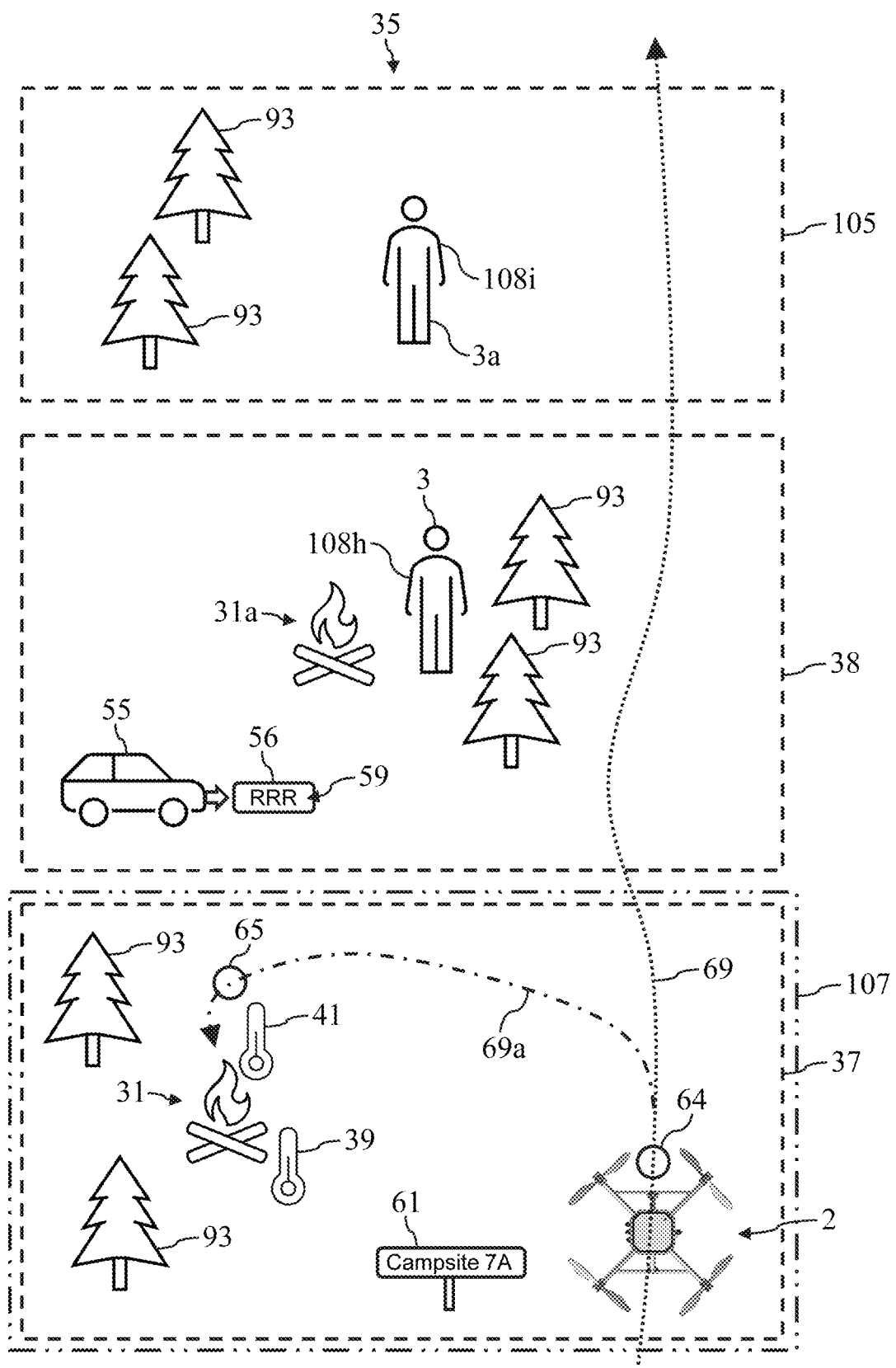
FIG. 8 illustrates a diagrammatic view of a camping area, according to some embodiments.

AI can also be used to determine if a person is not present at a campsite by determining that the campsite does not have any shapes that are indicative of a person. FIG. 8 illustrates a first campsite 37 that does not have any shapes that are indicative of a person. FIG. 8 illustrates a second campsite 38 that has one shape 108*h* that is indicative of a person 3. FIG. 8 illustrates a third campsite 105 that has one shape 108*i* that is indicative of a person 3*a*.

AI can learn from past data and make predictions about new data. In the context of detecting people, machine learning algorithms are trained on data such as human body shapes to enable the drone system 1 to determine if a future shape is indicative of a person being present.

In the context of detecting fires, machine learning algorithms are trained on data such IR pictures of campfires to enable the drone system 1 to determine if a future IR picture is indicative of a fire being present.

People often have a fire at their campsite during dark evening hours. Many different types of cameras (e.g., cameras 32, 53) can employ filters that enable the cameras to "see" in very low light conditions. Infrared cameras 34 can "see" in conditions where there is zero light that is visible to humans. As a result, drones 2 can look for people at campsites even when there is very little light that is visible to humans and even when there is no light that is visible to humans.

AI can detect if a fire is present in many different ways. In some embodiments, the drone system 1 comprises a drone 2 that has an infrared camera 34. The infrared camera 34 can detect the temperature of objects (e.g., people, campfires) located in the campsite. A campfire's core temperature typically ranges from about 1,500 to 1,650 degrees Fahrenheit but can reach up to around 2,000 degrees Fahrenheit in a large campfire. In contrast, human skin temperature is typically around 92 to 99 degrees Fahrenheit, which is far lower than typical campfire temperatures.

The drone 2 can be equipped with an IR camera 34 that can detect heat. Using AI, these thermal images (taken by the IR camera 34) can be analyzed by the drone system 1 to identify the heat signature of a human body (in contrast to the heat signatures of other items in the campsite), even in difficult lighting or visibility conditions.

In some embodiments, detecting a heat signature, by the infrared camera 34, of 92 to 99 degrees Fahrenheit is indicative of a person being present at the campsite. In some embodiments, not detecting a heat signature, by the infrared camera 34, of 92 to 99 degrees Fahrenheit is indicative of a person not being present at the campsite. Some embodiments comprise determining, by the drone system, that a heat signature is indicative of a person not being present at the first campsite because the heat signature does not include a temperature of 92 to 99 degrees Fahrenheit.

In some embodiments, detecting a heat signature, by the infrared camera 34, of 90 to 102 degrees Fahrenheit is indicative of a person being present at the campsite. In some embodiments, not detecting a heat signature, by the infrared camera 34, of 90 to 102 degrees Fahrenheit is indicative of a person not being present at the campsite. Some embodiments comprise determining, by the drone system, that a heat signature is indicative of a person not being present at the first campsite because the heat signature does not include a temperature of 90 to 102 degrees Fahrenheit.

Some embodiments comprise determining, by the drone system, that a heat signature is indicative of a fire being present at the campsite and/or in a firepit because the heat signature includes a temperature that is greater than a predetermined threshold.

Some embodiments comprise determining, by the drone system, that a heat signature is indicative of a first fire because the heat signature is greater than 190 degrees Fahrenheit, greater than 250 degrees Fahrenheit, greater than 500 degrees Fahrenheit, and/or greater than 1,000 degrees Fahrenheit.

Some embodiments comprise determining, by the drone system, that a heat signature is indicative of a first fire because the heat signature is greater than a predetermined threshold. A campfire's core temperature typically ranges from about 1,500 to 1,650 degrees Fahrenheit, but in some embodiments, using a predetermined threshold of 190 degrees Fahrenheit or 250 degrees Fahrenheit is helpful because the IR camera only sees the surface, and a temperature above 190 degrees Fahrenheit or 250 degrees Fahrenheit generally indicates that a fire is still burning underneath non-burning (e.g., previously burning) materials in a firepit. For example, a charred log that is no longer burning can hide hot coals.

Using a predetermined threshold that is too low can sometimes lead to false positives (e.g., due to the sun heating surfaces on bright, hot days). Some embodiments use a predetermined threshold of 400 degrees Fahrenheit or 600 degrees Fahrenheit.

Some embodiments comprise determining, by the drone system, that a heat signature is indicative of a fire at the first campsite and/or in a firepit (as defined by GPS coordinates or a geofence) because the heat signature includes a temperature that is greater than a predetermined threshold, is greater than 190 degrees Fahrenheit, is greater than 250 degrees Fahrenheit, is greater than 500 degrees Fahrenheit, and/or is greater than 1,000 degrees Fahrenheit.

The AI can also use historical data and predictive analysis to determine where a campfire might be located at a campsite. For example, the AI can realize that the fire will most likely be located in a firepit or near a picnic table where stoves are often used. Using this historical data can enable the AI of the drone system 1 to avoid notifying a remote computing device 45 about cooking stoves while still carefully monitoring for fires in firepits or other areas of a campsite where cooking stoves are not commonly used.

The AI of the drone system 1 can control the drone's 2 flight, enabling the drone 2 to navigate autonomously. This includes avoiding obstacles, maintaining a stable hover, and moving in patterns that maximize the efficiency of the drone's 2 search for fires and people. The AI can also adjust these patterns based on real-time data, such as changes in weather or light conditions. The AI of the drone system 1 can control the drone's 2 flight such that the drone 2 flies along a predetermined flight path (e.g., by following a path marked by GPS coordinates).

After identifying a fire that is unattended, the drone 2 can relay the GPS location data in real time to an enforcement official who can immediately respond. The enforcement official can be a forest ranger, a camp host, people at adjacent campsites, firefighters, and anyone else you might be able to quickly and safely put out the unattended fire. The AI can also annotate and highlight important visual information in the video feed, making it easier for human operators and enforcement officials to understand the situation.

It's worth noting that while AI can dramatically aid in this process, in some cases, human oversight can still be beneficial to confirm findings and make critical decisions. The AI can help make the search and response processes quicker and more efficient, but in some cases, success might still depend on the skill and experience of human operators and enforcement officials. (Future AI developments will likely reduce or even eliminate the need for human oversight or involvement.)

Figure 6:
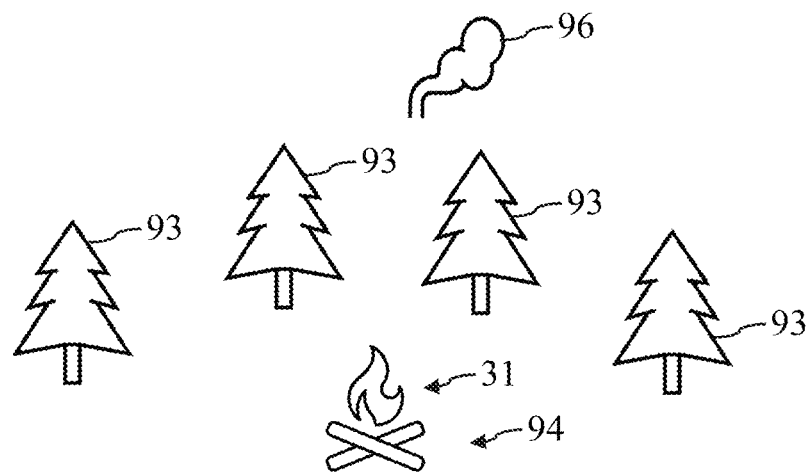
FIG. 6 illustrates a diagrammatic view of an area that comprises a fire, according to some embodiments.

FIG. 6 illustrates a first fire 31, which can be located in a camping area 35 or in any other area. Many wildfires are started by people who burn debris (e.g., in their backyards, on private property). Some embodiments comprise sending a drone 2 to a location 94 (e.g., a GPS location) of a fire 31 in response to receiving, by the drone system 1, an indication 96 that there is a fire 31 at the location 94. Some embodiments comprise determining, by the drone system 1, that a person is not present at the location 94 of the fire 31. In response to determining that there is a first fire 31 at the location 94 and determining that a person 3 is not being present at the location 94 of the fire 31, embodiments can comprise sending, by the drone system 1, a notification 42 regarding the first fire 31 to a remote computing device 45.

Figure 7:
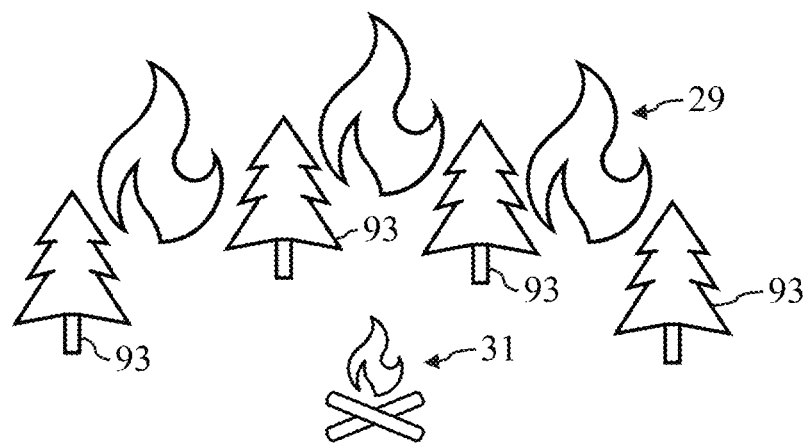
FIG. 7 illustrates a diagrammatic view of an area that comprises a wildfire, according to some embodiments.

FIG. 7 illustrates a fire 31 that was left unattended and, as a result, started a wildfire 29.

FIG. 1 illustrates a perspective view of a drone 2. The drone 2 can comprise a tank 97 that holds a fire retardant 46. Program instructions 4 can open a valve 99 to spray the fire retardant 46 on a fire 31. The tank 97 can comprise a pressure gauge 98.

The fire retardant 46 can be water or a chemical configured to put out a fire. The fire retardant 46 can be a liquid, powder, gas, or any other substance configured to put out a fire.

The drone 2 can comprise a microphone 103 and a speaker 104 configured to enable the drone system 1 to hear a person 3 and speak with the person 3.

Embodiments can comprise defining a campsite 37 using a geofence 107. Creating a geofence involves defining a virtual boundary around a physical area (such as a campsite 37). This boundary can then be used in conjunction with a GPS-enabled device to trigger certain events when the device enters or exits the specified area.

A geofence can be created by getting the latitude and longitude of the center of an area, and then determining the radius of the area that will be defined by the geofence.

A geofence can be created by defining a perimeter of an area (such as a campsite 37) with GPS coordinates.

There are several tools and platforms available to help set up a geofence, from custom solutions to commercial platforms such as Google Maps Geofencing API and Apple's Core Location.

Some embodiments comprise marking, by a geofence, a firepit. Some embodiments comprise marking, by a GPS coordinate, a firepit.

Infrared (IR) cameras, also known as thermal cameras, can detect radiation in the infrared range of the electromagnetic spectrum. These wavelengths correspond to heat, allowing infrared cameras to "see" temperature differences. In this way, IR cameras can enable a drone system 1 to "see" if a person or fire is present (e.g., by detecting temperatures associated with people and fires). AI image recognition can also enable drone systems 1 to analyze features (such as shapes, temperature gradients, and how large different temperature zones are) in IR pictures to help differentiate people and fires from other objects shown in the IR pictures.

AI can be used to detect a person in a picture taken by a camera system 7. One method uses Convolutional Neural Networks ("CNNs") due to their proficiency in handling image data.

Developing an AI system that can detect people (and fires) shown in a picture can begin with getting a large dataset of pictures and then labeling the people in the pictures. Datasets like COCO (Common Objects in Context) have thousands of images with annotated persons and other objects.

Images in the dataset might be of different dimensions, so they can be resized to a consistent size. Pixel values can be normalized to be between 0 and 1, which helps in training stability.

A Convolutional Neural Network can include convolutional layers, pooling layers, fully connected layers, and an output layer. Pre-trained models like VGG16, ResNet, and YOLO (You Only Look Once) can be employed and then fine-tuned to the specific task of person detection.

The AI model is trained using the labeled dataset. The Convolutional Neural Network learns to recognize patterns, edges, textures, and other features associated with people. Loss functions, like cross-entropy, measure the difference between the predicted output and actual labels. The model adjusts its weights to minimize this loss using optimization algorithms like Adam or SGD.

After training, the AI model's performance is evaluated on a separate set of images (often called the "validation set") that it hasn't seen before. Metrics such as precision, recall, and F1-score can be used to measure its accuracy.

For a new image (e.g., taken by a camera system 7 of a drone 2 flying over a campsite 37), the trained model scans and looks for patterns it has learned that correspond to a person. In more sophisticated models, like YOLO or SSD (Single Shot Multibox Detector), the AI can detect multiple objects, including people (and fires), and provide bounding boxes around each detected object in real-time.

A drone system 1 can comprise drones 2, program instructions 4, processors 6, memories 6, 12, computer systems 9, communication systems 10, software 11, image analysis systems 13, artificial intelligence systems 14, GPS devices 15, map information 16, drone control systems 17, antennas 18, receivers 19, transmitters 20, GPS locations 21, data 22, cellular systems 23, batteries 24, and additional components.

The drone system 1 can communicate with a remote computing device 45 (e.g., via Bluetooth, cellular networks, radio networks, telecommunication networks, satellite networks, cloud networks, the internet). The remote computing device 45 can send communications 117 to the drone system 1.

Some embodiments comprise at least one memory 6 having program instructions 4 and at least one processor 5 configured to execute the program instructions 4 to carry out the methods described herein using the hardware described herein.

In some embodiments, a first drone 2 comprises an infrared camera system 33. Embodiments can comprise flying, by the drone system 1, a first drone 2 in view of a camping area 35 having a first campsite 37; and detecting, by the infrared camera system 33, a first heat signature 39 of the first campsite 37.

As used herein, flying a drone 2 "in view" of an area 35 means the drone 2 could "see" the area 35 if the drone 2 were equipped with a camera system could take pictures in all directions.

The camping area 35 can include many campsites.

In some embodiments, a first drone 2 comprises an infrared camera system 33. Embodiments can comprise flying, autonomously by the drone system 1, a first drone 2 in view of a camping area 35 having a first campsite 37; and detecting, by the infrared camera system 33, a first heat signature 39 of the first campsite 37.

Some embodiments comprise determining, by the drone system 1, that the first heat signature 39 is indicative of a first fire 31; detecting, by the infrared camera system 33, a second heat signature 40 of the first campsite 37; and determining, by the drone system 1, that the second heat signature 40 is indicative of a person 3 not being present at the first campsite 37.

In some embodiments, the second heat signature 40 comprises many IR pictures of a campsite 37. Determining, by the drone system 1, that the second heat signature 40 is indicative of a person 3 not being present at the first campsite 37 can comprise determining that none of the IR pictures include a temperature (e.g., 92 to 99 degrees Fahrenheit) that indicative of a person being present 3 in the campsite 37.

Some embodiments comprise, in response to determining that the first heat signature 39 is indicative of the first fire 31 and determining that the second heat signature 40 is indicative of the person 3 not being present at the first campsite 37: sending, by the drone system 1, a notification 42 regarding the first fire 31 to a remote computing device 45.

In some embodiments, the notification 42 is a wireless notification 42. The notification 42 can be sent directly from the drone system 1 to the remote computing device 45. The notification 42 can be sent indirectly from the drone system 1 to the remote computing device 45 via intermediary communication systems (e.g., cellular communication systems, telecommunication systems, internet communication systems, servers, cloud computing systems).

The notification 42 can be configured to alert a person 3a that there is an unattended fire at a campsite 37. The person 3a can be a reservation holder 50 who started the fire 31 and then left the campsite 37 while the fire 31 was still burning. The person 3a can be an enforcement official. The enforcement official can be a forest ranger, a camp host, people at adjacent campsites, firefighters, and anyone else you might be able to quickly and safely put out the unattended fire.

The notification 42 can include a description of the campsite 37 (such as an alphanumeric identification 61 of the campsite 37), a map location of the campsite 37, and/or GPS coordinates of the campsite 37 to enable the person 3a to know where to go to put out the fire 31. The notification 42 can include directions to the campsite 37.

The notification 42 can include a name and/or a picture of the reservation holder 50 (to help the person 3a recognize the reservation holder 50). The notification 42 can include pictures of the fire 31 and/or pictures of the campsite 37 (e.g., to show the person 3a that no humans are present at the campsite 37).

In some embodiments, the notification 42 is sent to a remote computing device 45 that is not monitored by a human. For example, the notification 42 can be sent to a remote computing device 45 that is monitored by AI or other software. The AI or other software can take actions in response to receiving the notification such as determining if the AI or other software should notify firefighters, deploy firefighting drones, notify park rangers, notify campground hosts, and/or notify law enforcement.

In response to determining that the first heat signature 39 is indicative of the first fire 31 and determining that the second heat signature 40 is indicative of the person 3 not being present at the first campsite 37, some embodiments comprise delivering, by the first drone 2, a fire retardant 46 on the first fire 31.

The fire retardant can be water, water mist, foam, carbon dioxide, powder, wet chemicals, and/or any other material configured to help put out a fire. In some embodiments, the drone 2 carries a fire extinguisher and includes an electronic valve 99. Program instructions 4 can be configured to open the electronic valve 99 to cause a fire retardant 46 to exit a tank 97 and drop from the drone 2 onto the fire 31.

Delivering, by the first drone 2, a fire retardant 46 on the first fire 31 can be accomplished in many ways including dropping the fire retardant 46 on the first fire 31, spraying the fire retardant 46 on the first fire 31, and distributing the fire retardant 46 on the first fire 31.

Some embodiments comprise, in response to determining that the first heat signature 39 is indicative of the first fire 31 and determining that the second heat signature 40 is indicative of the person 3 not being present at the first campsite 37: fining, by the drone system 1, the person 3 (who can be the reservation holder 50). The fine 48 can be a monetary amount (e.g., $100). Many campsite reservation processes include the person 3 providing a credit card number. This credit card number can later be charged the fine 48.

A person can reserve a campsite 37 via many methods including but not limited to filling out a campsite payment form and then putting the form (along with money) in a box; calling a campsite reservation service; and using a campsite reservation website such as Recreation.gov or Parks.wa.gov. A person who has reserved and/or paid for a campsite is a reservation holder 50.

Some embodiments comprise determining, by the drone system 1, a reservation holder 50 associated with the first campsite 37. Some embodiments comprise, in response to determining that the first heat signature 39 is indicative of the first fire 31 and determining that the second heat signature 40 is indicative of the person 3 not being present at the first campsite 37: fining, by the drone system 1, the reservation holder 50.

Determining, by the drone system 1, a reservation holder 50 associated with the first campsite 37 can be accomplished in many ways including searching the database of Recreation.gov or Parks.wa.gov to identify the person 3 who reserved and/or paid for the campsite 37.

In some embodiments, a first drone 2 comprises a visible-light camera system 52. The visible-light camera system 52 can comprise one or more visible-light cameras 53.

Some embodiments comprise, in response to determining that the first heat signature 39 is indicative of the first fire 31 and determining that the second heat signature 40 is indicative of the person 3 not being present at the first campsite 37: taking, by the visible-light camera system 52, at least one picture 89 of the first campsite 37.

In some embodiments, the first drone 2 comprises a visible-light camera system 52. Some embodiments comprise, in response to determining that the first heat signature 39 is indicative of the first fire 31 and determining that the second heat signature 40 is indicative of the person 3 not being present at the first campsite 37: flying, autonomously by the first drone 2, closer to an automobile 55 having a license plate 56, and then taking, by the visible-light camera system 52, a picture 57 of the license plate 56. The license plate 56 can comprise an alphanumeric identification 59. The automobile 55 can be located in the campsite 37, adjacent to the campsite 37, an a road adjacent to the campsite 37, and/or within 100 feet of the campsite 37.

As used herein, an "alphanumeric identification" can comprise alphabetical characters (letters) and/or numerical characters (numbers). The characters in an "alphanumeric identification" can be in any language.

Some embodiments comprise sending, by the drone system 1 a notification 42 comprising the alphanumeric identification 59 to a remote computing device 45.

Some embodiments use Global Positioning System ("GPS") locations.

A first set of GPS locations can enable the drone system 1 to autonomously fly the first drone 2 from one campsite to the next campsite throughout a camping area 35 that could have dozens or even hundreds of campsites. A second set of GPS locations can enable the drone system 1 to autonomously fly the first drone 2 within boundaries (e.g., a geofence) of a single campsite to more thoroughly inspect the single campsite for fires and people than would be practical (at least in some embodiments but not in all embodiments) using a flight path optimized for flying from one campsite to the next campsite throughout a camping area 35 to quickly check the entire camping area 35 for fires.

Some embodiments comprise determining, by the drone system 1, a GPS location 62 of the first fire 31; and associating, by the drone system 1, the GPS location 62 with an alphanumeric identification 61 of the first campsite 37. Some embodiments comprise, in response to determining that the first heat signature 39 is indicative of the first fire 31 and determining that the second heat signature 40 is indicative of the person 3 not being present at the first campsite 37: sending, by the drone system 1, the alphanumeric identification 61 to the remote computing device 45.

In some embodiments, a first drone 2 comprises an infrared camera system 33. The infrared camera system 33 can comprise one or more infrared cameras 34.

Embodiments can comprise flying a first drone 2 over a camping area 35 having a first campsite 37. Embodiments can comprise detecting, by the infrared camera system 33, a first heat signature 39 of the first campsite 37. The first heat signature 39 can be the heat signature of a first fire 31 located in the first campsite 37.

In some embodiments, the infrared camera system 33 detects the first heat signature 39 while the drone is at a first location 64. Embodiments can comprise determining, by the drone system 1, that the first heat signature 39 is indicative of a first fire 31; detecting, by the infrared camera system 33, a second heat signature 40 of the first campsite 37; and determining, by the drone system 1, that the second heat signature 40 is indicative of a person 3 not being present at the first campsite 37.

FIG. 8 illustrates a diagrammatic view of a camping area 35. The camping area 35 can comprise a first campsite 37, a second campsite 38 (that has a fire 31a), a third campsite 105, and additional campsites. (The additional campsites are not shown in FIG. 8 to enable clearer viewing of the first campsite 37, the second campsite 38, and the third campsite 105.)

As illustrated in FIG. 8, in response to determining, by the drone system 1, that the first heat signature 39 is indicative of the first fire 31, embodiments can comprise altering, by the drone system 1, a first flight path 69 of the first drone 2 to fly the first drone 2 closer to the first fire 31; then detecting, by the infrared camera system 33, a third heat signature 41 of the first fire 31 at a second location 65 that is closer to the first fire 31 than the first location 64, and then determining, by the drone system 1, that the third heat signature 41 is indicative of the first fire 31.

As illustrated in FIG. 8, the drone system 1 plans to fly the drone 2 along a first flight path 69 (e.g., from the first campsite 37 to the second campsite 38 to the third campsite 105), but then alters the flight path as shown by altered flight path 69a. In some cases, the first heat signature 39 can be less accurate than the third heat signature 41 (e.g., due to the limited view of the infrared camera 34 from the first flight path 69 and the superior view of the infrared camera 34 from the altered flight path 69a). The view of the third heat signature 41 can be from directly above the fire 31 rather than from a relatively low viewing angle (as is sometimes the case from the first flight path 69).

In some embodiments, the first flight path 69 travels directly above each firepit in the camping area 35 to provide highly accurate perspectives from which the infrared camera 34 can check the temperature of the each firepit. Traveling directly above each firepit can help prevent trees 93 from blocking the camera system's 7 view of each firepit.

Some embodiments comprise, in response to determining that the third heat signature 41 is indicative of the first fire 31 and determining that the second heat signature 40 is indicative of the person 3 not being present at the first campsite 37: sending, by the drone system 1, a notification 42 regarding the first fire 31 to a remote computing device 45.

Figure 9:
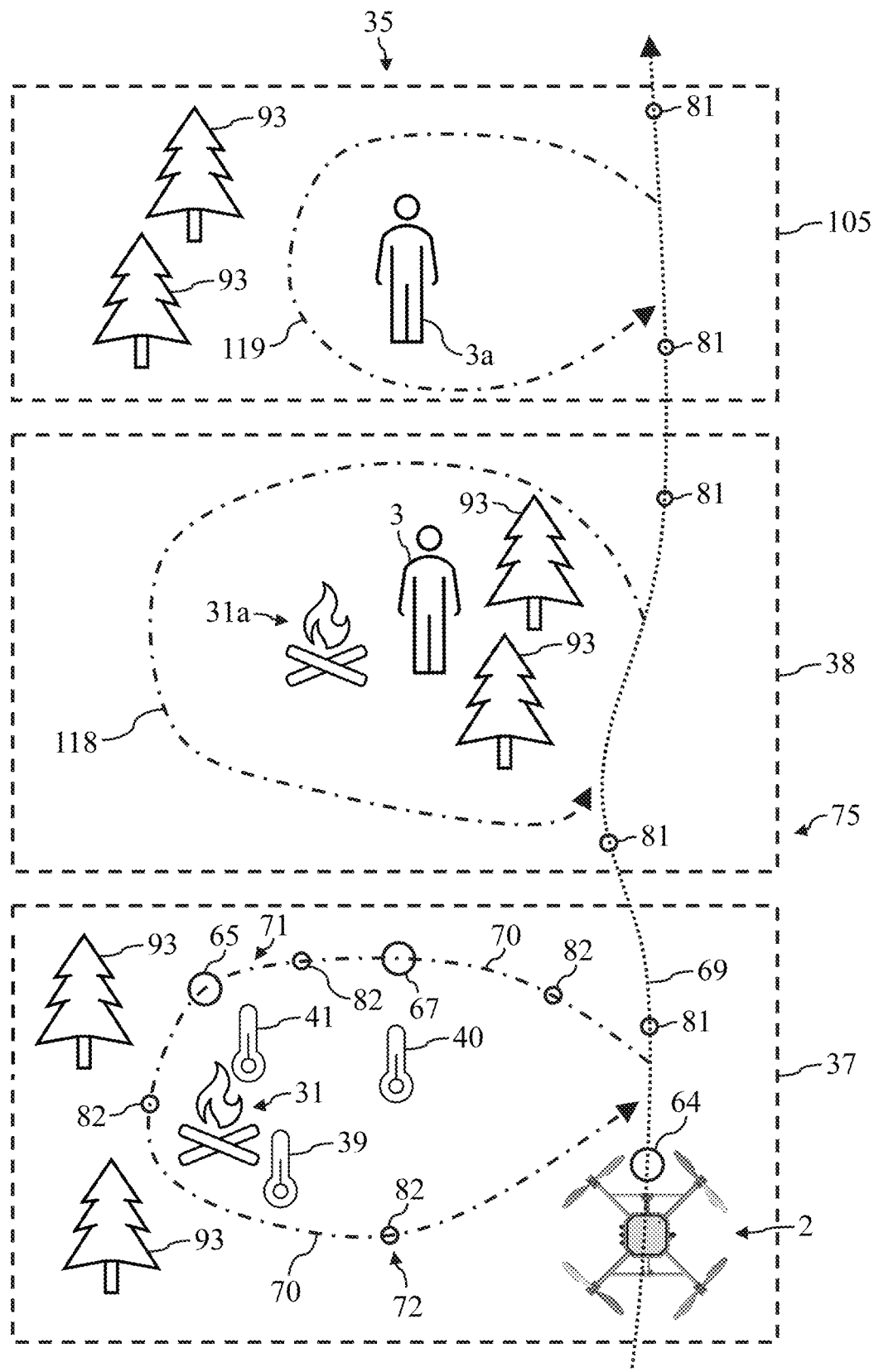
FIG. 9 illustrates a diagrammatic view of a camping area, according to some embodiments.

Referring now primarily to FIG. 9, in some embodiments, a first drone 2 comprises an infrared camera system 33. Embodiments can comprise flying a first drone 2 over a camping area 35 having a first campsite 37. Embodiments can comprise detecting, by the infrared camera system 33, a first heat signature 39 of the first campsite 37.

In some embodiments, the infrared camera system 33 detects the first heat signature 39 while the drone is at a first location 64. Embodiments can comprise detecting the first heat signature 39 while the drone is at the first location 64; determining, by the drone system 1, that the first heat signature 39 is indicative of a first fire 31; detecting, by the infrared camera system 33, a second heat signature 40 of the first campsite 37; and determining, by the drone system 1, that the second heat signature 40 is indicative of a person 3 not being present at the first campsite 37.

In some embodiments, the infrared camera 34 of the drone 2 takes many temperature readings of the first campsite 37 (e.g., as the drone flies along a path through the first campsite 37), and then the drone system 1 determines that none of these temperature readings are 92 to 99 degrees Fahrenheit and thereby determines that the heat signature 40 is indicative of a person 3 not being present at the first campsite 37.

In some embodiments, the infrared camera 34 of the drone 2 takes many temperature readings of the first campsite 37 (e.g., as the drone flies along a path through the first campsite 37), and then the drone system 1 determines that at least one of these temperature readings is greater than a predetermined threshold and thereby determines that the heat signature 39, 41 is indicative of a first fire 31 being present at the first campsite 37. In some embodiments, the predetermined threshold is 190 degrees Fahrenheit, 250 degrees Fahrenheit, 500 degrees Fahrenheit, or 1,000 degrees Fahrenheit.

Some embodiments comprise, in response to determining, by the drone system 1, that the first heat signature 39 is indicative of the first fire 31: leaving, by the first drone 2, a first flight path 69 configured to enable the first drone 2 to fly between the first campsite 37 and a second campsite 38 of the camping area 35; then flying, autonomously by the first drone 2, along a second flight path 70 configured to enable the infrared camera system 33 to detect a third heat signature 41 of the first fire 31 at a second location 65 that is not on the first flight path 69; then detecting, by the infrared camera system 33, the third heat signature 41 at the second location 65; and then determining, by the drone system 1, that the third heat signature 41 is indicative of the first fire 31.

Some embodiments comprise, in response to determining that the third heat signature 41 is indicative of the first fire 31 and determining that the second heat signature 40 is indicative of the person 3 not being present at the first campsite 37: sending, by the drone system 1, a notification 42 regarding the first fire 31 to a remote computing device 45.

The remote computing device 45 can be a cellular phone (e.g., of a park ranger or camp host), a tablet computer, a laptop computer, a desktop computer, a server, a cloud-based computer system, or any other computing device.

In some embodiments, the second flight path 70 curves around the first fire 31. In some embodiments, the second flight path 70 circles the first fire 31 and then rejoins the first flight path 69 to enable the drone 2 to go to the next campsite 38.

Some embodiments use Global Positioning System ("GPS") locations, which can be defined by Global Positioning System ("GPS") coordinates.

In some embodiments, the second flight path 70 comprises a portion 71 that is closer to the first fire 31 than the first flight path 69. The first flight path 69 can comprise a first set of GPS coordinates 81 configured to enable the first drone 2 to autonomously navigate between the first campsite 37 and the second campsite 38. The second flight path 70 can comprise a second set of GPS coordinates 82 configured to enable the first drone 2 to autonomously navigate through at least a portion 72 of the first campsite 37.

Figure 12:
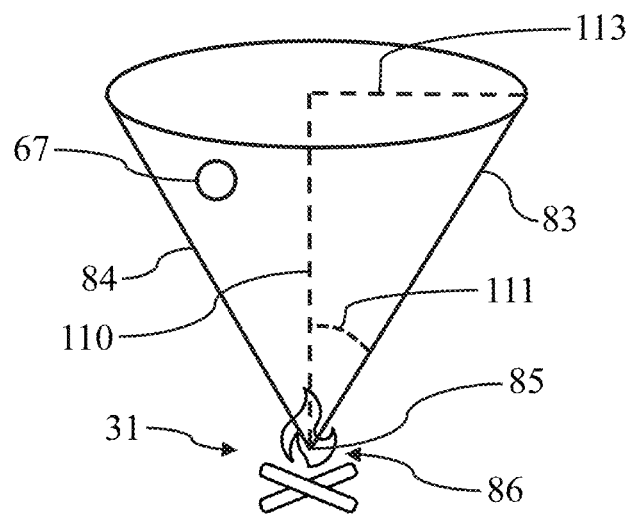
FIG. 12 illustrates a diagrammatic view of an area that is shaped as a cone, according to some embodiments.

FIG. 12 illustrates an area 83 that is shaped as a 45-degree cone 84. The cone 84 comprises a height 110, a radius 113, and an angle 111 (between the center line of the cone 84 and the side of the cone 84) that is 45 degrees.

In some embodiments, the second location 65 is located within an area 83 that is shaped as a 45-degree cone 84 having a vertex 85 that is located at a center 86 of the first fire 31. The height 110 of the cone 84 can be 100 feet. Embodiments can comprise, flying, autonomously by the first drone 2, along the second flight path 70 through the area 83.

Referring now primarily to FIG. 9, in some embodiments, an infrared camera system 33 detects the first heat signature 39 while the drone is located at a first location 64. Embodiments can comprise determining, by the drone system 1, that the first heat signature 39 is indicative of a first fire 31.

Embodiments can comprise, in response to determining, by the drone system 1, that the first heat signature 39 is indicative of the first fire 31: leaving, by the first drone 2, a first flight path 69 configured to enable the first drone 2 to fly between the first campsite 37 and a second campsite 38 of the camping area 35, then flying, autonomously by the first drone 2, along a second flight path 70. Embodiments can comprise, at a second location 67 located on the second flight path 70, detecting, by the infrared camera system 33, a second heat signature 40 of the first campsite 37.

Embodiments can comprise determining, by the drone system 1, that the second heat signature 40 is indicative of a person 3 not being present at the first campsite 37.

Embodiments can comprise, in response to determining that the first heat signature 39 is indicative of the first fire 31 and determining that the second heat signature 40 is indicative of the person 3 not being present at the first campsite 37: sending, by the drone system 1, a notification 42 regarding the first fire 31 to a remote computing device 45.

Figure 15:
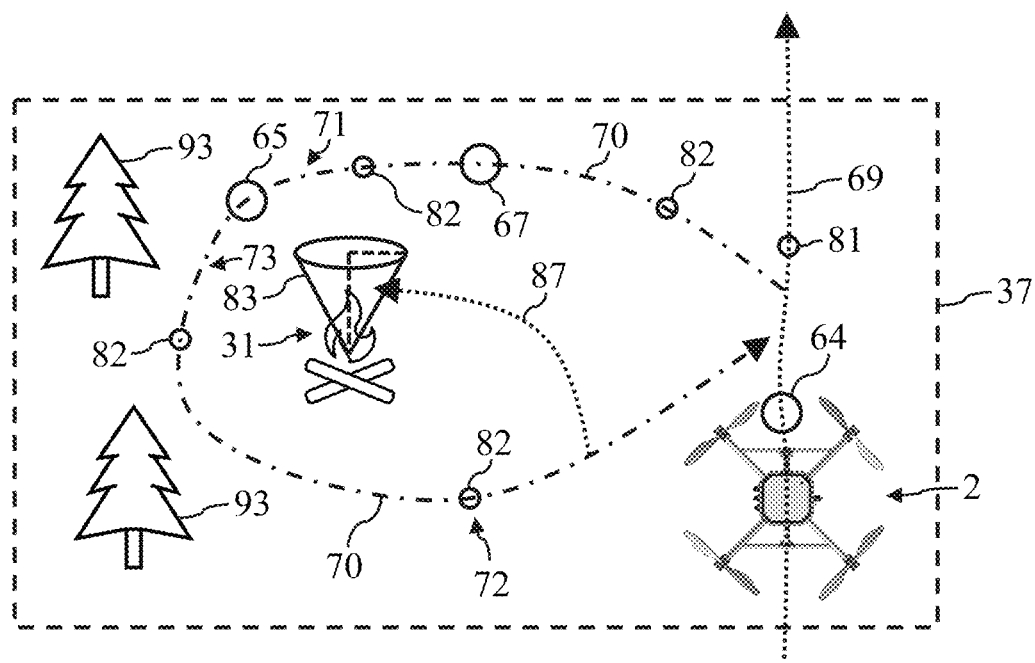
FIG. 15 illustrates a diagrammatic view of a campsite, according to some embodiments.

Referring now primarily to FIGS. 15, 12, and 9, in some embodiments, the second flight path 70 is configured to search for the person 3, and a third flight path 87 is configured to put out the first fire 31. The third flight path 87 can enter the area 83 that is shaped as a 45-degree cone 84 having a vertex 85 that is located at a center 86 of the first fire 31.

Embodiments can comprise, in response to determining that the first heat signature 39 is indicative of the first fire 31 and determining that the second heat signature 40 is indicative of the person 3 not being present at the first campsite 37: leaving, by the first drone 2, the second flight path 70; then flying, autonomously by the drone system 1, the first drone 2 along a third flight path 87 closer to the first fire 31 than at least a portion 73 of the second flight path 70; and then delivering, by the first drone 2, a fire retardant 46 on the first fire 31 while flying, by the drone system 1, the first drone 2 along the third flight path 87. The first drone 2 can spray the fire retardant 46 out of a nozzle 100 that is fluidly coupled to a tank 97 of fire retardant 46.

In some embodiments, the third flight path 87 comprises a spiral-shaped portion 74. Embodiments can comprise flying, autonomously by the drone system 1, the first drone 2 along the spiral-shaped portion 74 while autonomously delivering, by the first drone 2, the fire retardant 46 on the first fire 31.

In some embodiments, the second flight path 70 comprises a portion 71 that is closer to the first fire 31 than the first flight path 69.

In some embodiments, the first location 64 is on the first flight path 69, the first flight path 69 comprises a first set of GPS coordinates 81 configured to enable the first drone 2 to navigate through at least a portion 75 of the camping area 35, the portion 75 of the camping area 35 comprises the first campsite 37 and the second campsite 38, and the second flight path 70 comprises a second set of GPS coordinates 82 configured to enable the first drone 2 to navigate through at least a portion 72 of the first campsite 37.

In some embodiments, the second location 67 is closer to the first fire 31 than the first location 64.

In some embodiments, the second location 67 is located within an area 83 that is shaped as a 45-degree cone 84 having a vertex 85 that is located at a center 86 of the first fire 31. The height 110 of the cone can be 100 feet, 1,000 feet, at least 500 feet, and/or less than 1,200 feet.

In some embodiments, detecting, by the infrared camera system 33, the second heat signature 40 of the first campsite 37 comprises flying, autonomously by the first drone 2, into the area 83 that is shaped as the 45-degree cone, orienting, by the first drone 2, the infrared camera system 33 outward from the cone to detect the second heat signature 40 outside the 45-degree cone while the first drone 2 is located inside the 45-degree cone.

The drone system 1 can cause the drone 2 to leave the first flight path 69 and then more thoroughly check a second campsite 38 for people and fires via another flight path 118. The drone system 1 can cause the drone 2 to leave the first flight path 69 and then more thoroughly check a third campsite 105 for people and fires via another flight path 119.

In some embodiments, a drone system 1 comprises drones that do not fly but instead have wheels to drive around camping areas 35 looking for fires. Some drone systems 1 comprise many drones that look like cars, which can be any size. Some cars are approximately 18 inches in length, have four wheels, and are driven autonomously by the drone system 1 from one GPS coordinate to another GPS coordinate along a path that enables the cars to detect campfires and people.

Some embodiments comprise drone systems 1 used in camping areas 35. The drone systems 1 described herein can be used outside of camping areas 35.

Some embodiments comprise using a drone system 1. A drone system 1 can comprise a first drone 2 to prevent a wildfire 29. A drone system 1 can comprise many flying drones to prevent wildfires 29. Each drone can comprise any of the features described in the context of the first drone 2.

In some embodiments, a first drone 2 comprises a camera system 7. The camera system 7 can comprise one or more cameras. Cameras can be configured to detect any light wavelength and light frequency including, but not limited to, light wavelengths and light frequencies for visible light, infrared light, and ultraviolet ("UV") light. As used herein, "visible light" is the light spectrum that is visible to humans.

In some embodiments, the camera system 7 comprises one or more infrared camera 34, ultraviolet ("UV") camera 32, and/or visible-light camera 53.

Some embodiments comprise autonomously flying, by the drone system 1, a first drone 2 in view of a camping area 35 having a first campsite 37; and detecting, by the infrared camera 34, a first heat signature 39 of the first campsite 37.

Some embodiments comprise determining, by the drone system 1, that the first heat signature 39 is indicative of a first fire 31.

Some embodiments comprise taking, by the camera system 7, at least one picture 89 of the first campsite 37; and determining, by the drone system 1, that the at least one picture 89 does not show a person 3 at the first campsite 37.

Some embodiments comprise, in response to determining that the first heat signature 39 is indicative of the first fire 31 and determining that the at least one picture 89 does not show the person 3 at the first campsite 37: sending, by the drone system 1, a notification 42 regarding the first fire 31 to a remote computing device 45.

In some embodiments, determining that the at least one picture 89 does not show the person 3 at the first campsite 37 comprises determining, by the drone system 1, that the at least one picture 89 does not comprise a shape 108a, 108b, 108c, 108d, 108e, 108f, 108g (illustrated in FIGS. 10 and 11) indicative of the person 3.

In some embodiments, the camera system 7 comprises an infrared ("IR") camera 34. Some embodiments comprise taking, by the infrared camera 34, the at least one picture 89 of the first campsite 37.

In some embodiments, the camera system 7 comprises an ultraviolet ("UV") camera 32. Some embodiments comprise taking, by the UV camera, the at least one picture 89 of the first campsite 37.

In some embodiments, the camera system 7 comprises a visible-light camera 53. Some embodiments comprise taking, by the visible-light camera 53, the at least one picture 89 of the first campsite 37.

Some embodiments comprise a camera that can detect IR, UV, and visible light, and that can take the at least one picture 89 using IR, UV, and/or visible light.

Embodiments can use many types of light to take pictures including UV light, visible light, and IR light. Embodiments can detect a shape 108a, 108b, 108c, 108d, 108e, 108f, 108g indicative of a person 3 with many wavelengths of light. Embodiments can detect a shape 108a, 108b, 108c, 108d, 108e, 108f, 108g indicative of a person 3 with UV light, light that is visible to humans, IR light, and other types of light.

Some embodiments comprise sending, by the drone system 1, a notification 42 regarding the first fire 31 to the remote computing device 45. In some embodiments, the notification 42 comprises an identification (e.g., an alphanumeric identification 62) of the first campsite 37. In some embodiments, the notification 42 comprises the at least one picture 89 of the first campsite 37. A picture 89 can show the fire 31 (to help prove that there was an unattended fire at the campsite), a campsite identification (which can be a sign with the number of the campsite), camping gear such as tents and coolers (to help prove that the reservation holder 50 was using the campsite), and/or a car (e.g., owned by the reservation holder 50 to help prove that the reservation holder 50 was using the campsite).

Some embodiments verify no person is present at the campsite using both heat-signature analysis and picture analysis.

Some embodiments comprise detecting, by the infrared camera 34, a second heat signature 40 of the first campsite 37; and determining, by the drone system 1, that the second heat signature 40 is indicative of the person 3 not being present at the first campsite 37.

Some embodiments comprise, in response to determining that the first heat signature 39 is indicative of the first fire 31; determining that the at least one picture 89 does not show the person 3 at the first campsite 37; and determining that the second heat signature 40 is indicative of the person 3 not being present at the first campsite 37: sending, by the drone system 1, the notification 42 regarding the first fire 31 to the remote computing device 45.

Some embodiments comprise, in response to determining that the first heat signature 39 is indicative of the first fire 31 and determining that the at least one picture 89 does not show the person 3 at the first campsite 37: delivering, by the first drone 2, a fire retardant 46 on the first fire 31.

Some embodiments comprise, in response to determining that the first heat signature 39 is indicative of the first fire 31 and determining that the at least one picture 89 does not show the person 3 at the first campsite 37: fining, by the drone system 1, the person 3.

Some embodiments comprise determining, by the drone system 1, a reservation holder 50 associated with the first campsite 37. Some embodiments comprise, in response to determining that the first heat signature 39 is indicative of the first fire 31 and determining that the at least one picture 89 does not show the person 3 at the first campsite 37: fining, by the drone system 1, the reservation holder 50.

In some embodiments, the at least one picture 89 comprises a first picture 91 and a second picture 92. Some embodiments comprise, in response to determining that the first heat signature 39 is indicative of the first fire 31 and determining that the at least one picture 89 does not show the person 3 at the first campsite 37: flying, autonomously by the first drone 2, closer to an automobile 55 having a license plate 56, and then taking, by the camera system 7, a third picture 57 of the license plate 56.

In some embodiments, the automobile 55 can be parked at the first campsite 37, the automobile 55 can be parked adjacent to the first campsite 37, and/or the automobile 55 can be parked within 500 feet of the first campsite 37.

In some embodiments, the license plate 56 comprises an alphanumeric identification 59. Embodiments can comprise sending, by the drone system 1, the notification 42 comprising the alphanumeric identification 59 to the remote computing device 45.

Embodiments can comprise determining, by the drone system 1, a GPS location 62 of the first fire 31; and associating, by the drone system 1, the GPS location 62 with an alphanumeric identification 61 of the first campsite 37.

There are many ways to associate a GPS location 62 with an alphanumeric identification 61 of the first campsite 37. For example, the first drone 2 can detect the GPS coordinates of the first fire 31. The drone system 1 can comprise map information 16 a memory 12 that knows which GPS coordinates are in which campsite on the map of the camping area 35. Then, when the drone system 1 determines there is a fire 31 at particular GPS coordinates, the software 11 can determine in which campsite the GPS coordinates are located.

Embodiments can compromise, in response to determining that the first heat signature 39 is indicative of the first fire 31 and determining that the at least one picture 89 does not show the person 3 at the first campsite 37: sending, by the drone system 1, the alphanumeric identification 61 to the remote computing device 45.

Referring now primarily to FIG. 9, in some embodiments, an infrared camera 34 detects the first heat signature 39 while the drone is located at a first location 64. Embodiments can comprise determining, by the drone system 1, that the first heat signature 39 is indicative of a first fire 31.

Embodiments can comprise, in response to determining, by the drone system 1, that the first heat signature 39 is indicative of the first fire 31: leaving, by the first drone 2, a first flight path 69 configured to enable the first drone 2 to fly between the first campsite 37 and a second campsite 38 of the camping area 35; and then flying, autonomously by the first drone 2, along a second flight path 70.

Embodiments can comprise, at a second location 67 located on the second flight path 70, taking, by the camera system 7, at least one picture 89 of the first campsite 37. Embodiments can comprise determining that the at least one picture 89 does not show a person 3 at the first campsite 37. Embodiments can comprise, in response to determining that the first heat signature 39 is indicative of the first fire 31 and determining that the at least one picture 89 does not show the person 3 at the first campsite 37: sending, by the drone system 1, a notification 42 regarding the first fire 31 to a remote computing device 45.

In some embodiments, the second flight path 70 is configured to search for the person 3. In some embodiments, a first flight path 69 is configured to fly over each firepit in a camping area 35. In some embodiments, a first flight path 69 is configured to fly along a road (or trail) of a camping area 35 (to minimize the degree to which the drone 2 disturbs the people camping). In contrast, the second flight path 70 can search a campsite 37 much more thoroughly than is typically the case with the first flight path 69 (in some embodiments).

Figure 13:
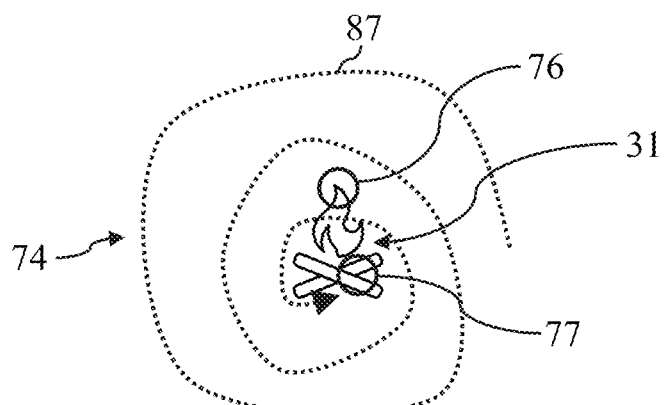
FIG. 13 illustrates a diagrammatic view of a flight path that comprises a spiral-shaped portion, according to some embodiments.
Figure 14:
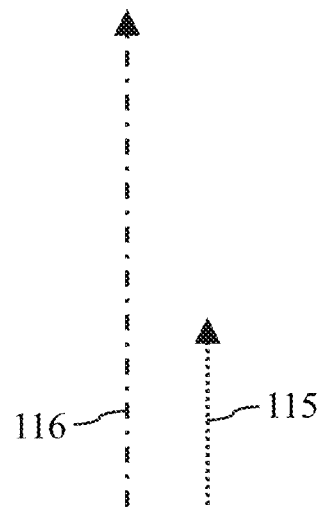
FIG. 14 illustrates a diagrammatic view of flight paths, according to some embodiments.

Referring now primarily to FIGS. 15, 13, and 9, some embodiments comprise, in response to determining that the first heat signature 39 is indicative of the first fire 31 and determining that the at least one picture 89 does not show the person 3 at the first campsite 37: leaving, by the first drone 2, the second flight path 70; then flying, autonomously by the drone system 1, the first drone 2 along a third flight path 87 closer to the first fire 31 than at least a portion 73 of the second flight path 70; and then delivering, by the first drone 2, a fire retardant 46 on the first fire 31 while flying, by the drone system 1, the first drone 2 along the third flight path 87.

In some embodiments, the third flight path 87 comprises a spiral-shaped portion 74. Some embodiments comprise flying, autonomously by the drone system 1, the first drone 2 along the spiral-shaped portion 74 while delivering, by the first drone 2, the fire retardant 46 on the first fire 31. The spiral-shaped portion 74 of the third flight path 87 can cause the first drone 2 to deliver the fire retardant 46 on an outer portion 76 of the first fire 31 and then deliver the fire retardant 46 on an inner portion 77 of the first fire 31 as the third flight path 87 spirals inward toward a center of the first fire 31.

In some embodiments, the second flight path 70 comprises a portion 71 that is closer to the first fire 31 than the first flight path 69. Embodiments can comprise flying, autonomously by the first drone 2, along the second flight path 70.

In some embodiments, the first location 64 is on the first flight path 69. The first flight path 69 can comprise a first set of GPS coordinates 81 configured to enable the first drone 2 to autonomously navigate through at least a portion 75 of the camping area 35. The portion 75 of the camping area 35 can comprise the first campsite 37 and the second campsite 38. The second flight path 70 can comprise a second set of GPS coordinates 82 configured to enable the first drone 2 to autonomously navigate through at least a portion 72 of the first campsite 37.

In some embodiments, the second flight path 70 has a longer length through the first campsite 37 than the first flight path 69. The first flight path 69 can comprise a first flight length 115 through the first campsite 37. The second flight path 70 can comprise a second flight length 116 through the first campsite 37. The second flight length 116 can be at least 50 percent longer than the first flight length 115 to enable a more thorough search for fires and people than would typically be the case with the first flight length 115. (Flight lengths do not need to be straight. Flight lengths are measured along the entire path taken by the drone 2.)

In some embodiments, the second location 67 is located closer to the first fire 31 than the first location 64.

In some embodiments, the second location 67 is located within an area 83 that is shaped as a 45-degree cone 84 having a vertex 85 that is located at a center 86 of the first fire 31. The height 110 of the cone can be 700 feet.

In some embodiments, taking, by the camera system 7, the at least one picture 89 of the first campsite 37 comprises flying, autonomously by the first drone 2, into the area that is shaped as the 45-degree cone, and orienting, by the first drone 2, the camera system 7 outward from the cone (e.g., while taking the at least one picture 89).

In some embodiments, the infrared camera 34 detects the first heat signature 39 while the drone is at a first location 64. Embodiments can comprise determining, by the drone system 1, that the first heat signature 39 is indicative of a first fire 31; taking, by the camera system 7, at least one picture 89 of the first campsite 37; and determining, by the drone system 1, that the at least one picture 89 does not show a person 3 at the first campsite 37.

Some embodiments comprise, in response to determining, by the drone system 1, that the first heat signature 39 is indicative of the first fire 31: leaving, by the first drone 2, a first flight path 69 configured to enable the first drone 2 to fly between the first campsite 37 and a second campsite 38 of the camping area 35, then flying, autonomously by the first drone 2, along a second flight path 70 configured to enable the infrared camera 34 to detect a third heat signature 41 of the first fire 31 at a second location 65 that is not on the first flight path 69, then detecting, by the infrared camera 34, the third heat signature 41 at the second location 65, and then determining, by the drone system 1, that the third heat signature 41 is indicative of the first fire 31.

Some embodiments comprise, in response to determining that the third heat signature 41 is indicative of the first fire 31 and determining that the at least one picture 89 does not show the person 3 at the first campsite 37: sending, by the drone system 1, a notification 42 regarding the first fire 31 to a remote computing device 45.

In some embodiments, a second flight path 70 curves around the first fire 31. In some embodiments, a second flight path 70 circles around at least 50 percent of the first fire 31. In some embodiments, a second flight path 70 curves around the first fire 31 and/or circles around the first fire 31 while taking pictures by a camera system 7.

In some embodiments, the second flight path 70 comprises a portion 71 that is closer to the first fire 31 than the first flight path 69. The first flight path 69 can comprise a first set of GPS coordinates 81 configured to enable the first drone 2 to autonomously navigate through at least a portion 75 of the camping area 35. The portion 75 of the camping area 35 can comprise the first campsite 37 and the second campsite 38. The second flight path 70 can comprise a second set of GPS coordinates 82 configured to enable the first drone 2 to autonomously navigate through at least a portion 72 of the first campsite 37.

In some embodiments, a second location 65 is located within an area 83 that is shaped as a 45-degree cone 84 having a vertex 85 that is located at a center 86 of the first fire 31. The height of the cone can be 100 feet. Embodiments can comprise flying, autonomously by the first drone 2, along the second flight path 70 through the area.

INTERPRETATION

To reduce unnecessary redundancy, not every element or feature is described in the context of every embodiment, but all elements and features described in the context of any embodiment herein and/or incorporated by reference can be combined with any elements and/or features described in the context of any other embodiments.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps are installed directly on remote computing devices, whereby developers create separate app versions for each type of remote computing device (e.g., iPhone devices and Android devices). Native apps may be stored on the remote computing device out of the box, or the native apps can be downloaded from a public or private app store and installed on the remote computing device.

Data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of using a drone system comprising a first drone to prevent a wildfire, wherein the first drone comprises a camera system, and the camera system comprises an infrared camera, the method comprising:

flying, by the drone system, the first drone in view of a camping area having a first campsite;

detecting, by the infrared camera, a first heat signature of the first campsite, wherein the infrared camera detects the first heat signature while the drone is at a first location;

determining, by the drone system, that the first heat signature is indicative of a first fire;

in response to determining, by the drone system, that the first heat signature is indicative of the first fire, leaving, by the first drone, a first flight path configured to enable the first drone to fly between the first campsite and a second campsite of the camping area, then flying, by the first drone, along a second flight path;

at a second location located on the second flight path, taking, by the camera system, at least one picture of the first campsite;

determining that the at least one picture does not show a person at the first campsite; and in response to determining that the first heat signature is indicative of the first fire and determining that the at least one picture does not show the person at the first campsite, sending, by the drone system, a notification regarding the first fire to a remote computing device, wherein the second location is located within an area that is shaped as a 45-degree cone having a vertex that is located at a center of the first fire, wherein the height of the cone is 100 feet, wherein taking, by the camera system, the at least one picture of the first campsite comprises flying, by the first drone, into the area that is shaped as the 45-degree cone, and orienting, by the first drone, the camera system outward from the cone.

2. The method of claim 1, wherein determining that the at least one picture does not show the person at the first campsite comprises determining, by the drone system, that the at least one picture does not comprise a shape indicative of the person.

3. The method of claim 1, wherein the camera system comprises a visible-light camera, the method comprising taking, by the visible-light camera, the at least one picture of the first campsite.

4. The method of claim 1, wherein the notification comprises an identification of the first campsite.

5. The method of claim 1, wherein the notification comprises the at least one picture of the first campsite.

6. The method of claim 1, further comprising detecting, by the infrared camera, a second heat signature of the first campsite;

determining, by the drone system, that the second heat signature is indicative of the person not being present at the first campsite; and in response to determining that the first heat signature is indicative of the first fire, determining that the at least one picture does not show the person at the first campsite, and determining that the second heat signature is indicative of the person not being present at the first campsite, sending, by the drone system, the notification regarding the first fire to the remote computing device.

7. The method of claim 1, further comprising in response to determining that the first heat signature is indicative of the first fire and determining that the at least one picture does not show the person at the first campsite, delivering, by the first drone, a fire retardant on the first fire.

8. The method of claim 1, further comprising in response to determining that the first heat signature is indicative of the first fire and determining that the at least one picture does not show the person at the first campsite, fining, by the drone system, the person.

9. The method of claim 1, further comprising determining, by the drone system, a reservation holder associated with the first campsite, and in response to determining that the first heat signature is indicative of the first fire and determining that the at least one picture does not show the person at the first campsite, fining, by the drone system, the reservation holder.

10. The method of claim 1, wherein the at least one picture comprises a first picture and a second picture, the method further comprising in response to determining that the first heat signature is indicative of the first fire and determining that the at least one picture does not show the person at the first campsite, flying, by the first drone, closer to an automobile having a license plate, and then taking, by the camera system, a third picture of the license plate.

11. The method of claim 10, wherein the license plate comprises an alphanumeric identification, the method further comprising sending, by the drone system, the notification comprising the alphanumeric identification to the remote computing device.

12. The method of claim 1, further comprising determining, by the drone system, a GPS location of the first fire; associating, by the drone system, the GPS location with an alphanumeric identification of the first campsite; and then in response to determining that the first heat signature is indicative of the first fire and determining that the at least one picture does not show the person at the first campsite, sending, by the drone system, the alphanumeric identification to the remote computing device.

13. The method of claim 1, wherein the second flight path is configured to search for the person, the method further comprising in response to determining that the first heat signature is indicative of the first fire and determining that the at least one picture does not show the person at the first campsite:

leaving, by the first drone, the second flight path, then flying, autonomously by the drone system, the first drone along a third flight path closer to the first fire than at least a portion of the second flight path, and then delivering, by the first drone, a fire retardant on the first fire while flying, by the drone system, the first drone along the third flight path.

14. The method of claim 13, wherein the third flight path comprises a spiral-shaped portion, the method further comprising flying, autonomously by the drone system, the first drone along the spiral-shaped portion while delivering, by the first drone, the fire retardant on the first fire.

15. The method of claim 1, wherein the second flight path comprises a portion that is closer to the first fire than the first flight path, the method comprising flying, autonomously by the first drone, along the second flight path.

16. The method of claim 1, wherein the first location is on the first flight path, the first flight path comprises a first set of GPS coordinates configured to enable the first drone to autonomously navigate through at least a portion of the camping area, the portion of the camping area comprises the first campsite and the second campsite, and the second flight path comprises a second set of GPS coordinates configured to enable the first drone to autonomously navigate through at least a portion of the first campsite.

17. The method of claim 1, wherein the second location is closer to the first fire than the first location.

18. The method of claim 1, further comprise detecting, by the infrared camera, a third heat signature at the second location, and then determining, by the drone system, that the third heat signature is indicative of the first fire; and in response to determining that the third heat signature is indicative of the first fire and determining that the at least one picture does not show the person at the first campsite, sending, by the drone system, the notification regarding the first fire to the remote computing device.

19. The method of claim 1, wherein the second flight path curves around the first fire.

20. The method of claim 1, wherein the second flight path comprises a portion that is closer to the first fire than the first flight path, the first flight path comprises a first set of GPS coordinates configured to enable the first drone to autonomously navigate through at least a portion of the camping area, the portion of the camping area comprises the first campsite and the second campsite, and the second flight path comprises a second set of GPS coordinates configured to enable the first drone to autonomously navigate through at least a portion of the first campsite.

21. The method of claim 1, further comprising, flying, autonomously by the first drone, along the second flight path through the area.

\* \* \* \* \*